United States Patent
Wang et al.

(10) Patent No.: US 11,375,488 B2
(45) Date of Patent: Jun. 28, 2022

(54) METHOD FOR DETERMINING AND CONFIGURING A RESOURCE USED FOR TRANSMITTING DOWNLINK DATA, TERMINAL AND BASE STATION

(71) Applicant: CHINA ACADEMY OF TELECOMMUNICATIONS TECHNOLOGY, Beijing (CN)

(72) Inventors: Lei Wang, Beijing (CN); Ekpenyong Tony, Beijing (CN); Fang-Chen Cheng, Beijing (CN); Xuejuan Gao, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 168 days.

(21) Appl. No.: 16/646,558

(22) PCT Filed: Jul. 30, 2018

(86) PCT No.: PCT/CN2018/097750
§ 371 (c)(1),
(2) Date: Mar. 11, 2020

(87) PCT Pub. No.: WO2019/047632
PCT Pub. Date: Mar. 14, 2019

(65) Prior Publication Data
US 2020/0275419 A1 Aug. 27, 2020

(30) Foreign Application Priority Data
Sep. 11, 2017 (CN) .......................... 201710814233.9

(51) Int. Cl.
*H04W 72/04* (2009.01)
*H04L 5/00* (2006.01)

(52) U.S. Cl.
CPC ......... *H04W 72/042* (2013.01); *H04L 5/0007* (2013.01); *H04L 5/0094* (2013.01); *H04W 72/0446* (2013.01); *H04W 72/0453* (2013.01)

(58) Field of Classification Search
CPC ........... H04W 72/042; H04W 72/0446; H04W 72/0453; H04W 72/1273; H04W 72/04;
(Continued)

(56) References Cited

U.S. PATENT DOCUMENTS

| 2011/0110296 | A1* | 5/2011 | Malladi | H04B 1/713 370/328 |
| 2012/0275405 | A1* | 11/2012 | Kim | H04W 72/08 370/329 |
| 2014/0092815 | A1 | 4/2014 | Ye et al. | |

FOREIGN PATENT DOCUMENTS

| CN | 103181109 A | 6/2013 |
| CN | 103687015 A | 3/2014 |

(Continued)

OTHER PUBLICATIONS

CATT, "Indication of NR-PDSCH starting symbol", 3GPP TSG HAN WG1 AH_NR Meeting, Spokane, USA, Jan. 16-20, 2017, total 2 pages, R1-1700194.

(Continued)

*Primary Examiner* — Dady Chery
(74) *Attorney, Agent, or Firm* — Kilpatrick Townsend & Stockton, LLP

(57) ABSTRACT

A method for determining and configuring a resource used for transmitting downlink data, a terminal and a base station: the base station configures, for each terminal, resource collections or resource collection subgroups used for receiving downlink data, and then the base station notifies the terminal, by means of an explicit signaling, whether all of the resource collections or each resource collection of the configured resource collections are available, or whether all (Continued)

S101
Based on received resource configuration information transmitted by a base station, determining a first time-frequency resource position of a first resource set or a first resource set group configured for a terminal by the base station for receiving downlink data S102
Based on received indication information transmitted by the base station for indicating whether all resource sets or each resource set of the first resource set or all resource set subgroups or each resource set subgroup of the first resource set group are/is used to transmit downlink data, determining a second time-frequency resource position of a second resource set or a second resource set group for receiving downlink data, wherein the first resource set group includes at least one resource set subgroup, and the at least one resource set subgroup includes at least one resource set of resource collection subgroups or each resource collection subgroup of the resource collection subgroups are available, thus allowing the terminal to determine, according to the notification, the time-frequency resource position of a resource used to receive downlink data, so that the terminal may carry out rate matching on the determined resource.

20 Claims, 5 Drawing Sheets

(58) Field of Classification Search
CPC .... H04W 28/26; H04W 48/08; H04L 5/0007; H04L 5/0094; H04L 5/00; H04L 1/0038; H04L 5/0012; H04B 1/713
See application file for complete search history.

(56) References Cited

FOREIGN PATENT DOCUMENTS

| | | |
|---|---|---|
| CN | 103813460 A | 5/2014 |
| KR | 101235967 B1 | 2/2013 |
| WO | 2014019234 A1 | 2/2014 |
| WO | 2017000248 A1 | 1/2017 |

OTHER PUBLICATIONS

Qualcomm Incorporated,"Resource reuse for data in DL control region", 3GPP TSG-HAN WG1#89, May 15-19, 2017, Hangzhou, P.R. China, total 3 pages, R1-1708612.
Huawei et al., "Resource multiplexing of downlink control and data", 3GPP TSG RAN WG1 NR Ad Hoc Meeting, Qingdao, China, Jun. 27-30, 2017, total 5 pages, R1-1709956.
CATT, "Flexible reuse of DL control resources for data transmission", 3GPP TSG RAN WG1 NR Ad-Hoc#2, Qingdao, P.R. China, Jun. 27-30, 2017, total 4 pages, R1-1710079.
Nokia et al., "Resource sharing between PDCCH and PDSCH in NR", 3GPP TSG-HAN WG1 Ad Hoc Meeting #2, Qingdao, China, Jun. 27-20, 2017, total 7 pages, R1-1710983.
NTT Docomo, Inc. "Resource sharing between data and control channels", 3GPP TSG RAN WG1 NR Ad-Hoc#2, Qingdao, P.R. China Jun. 27-30, 2017, total 7 pages, R1-1711093.
Huawei et al., "Resource multiplexing between PDCCH and PDSCH", 3GPP TSG RAN WG1 Meeting AH_NR#3, Nagoya, Japan, Sep. 18-21, 2017, total 7 pages, R1-1715566.
Panasonic, "DL/UL resource allocation", 3GPP TSG RANWG1 Meeting NR#3, Nagoya, Japan, Sep. 18-21, 2017, total 9 pages, R1-1715779.

* cited by examiner

METHOD FOR DETERMINING AND CONFIGURING A RESOURCE USED FOR TRANSMITTING DOWNLINK DATA, TERMINAL AND BASE STATION

This application is a National Stage of International Application No. PCT/CN2018/097750, filed Jul. 30, 2018, which claims priority to China Patent Application No. 201710814233.9, filed on Sep. 11, 2017, entitled "Method for Determining and Configuring Resource for Transmitting Downlink Data, Terminal and Base Station", which is hereby incorporated by reference in its entirety.

FIELD

The present disclosure relates to the field of communications, and more particularly to a method for determining and configuring a resource for transmitting downlink data, a terminal and a base station.

BACKGROUND

The mobile Internet is subverting a traditional mobile communication service mode, providing users with an unprecedented use experience and generating a profound impact on all aspects of work and life of people. The mobile Internet will promote the further upgrade of human social information interaction methods and provide the users with a richer service experience such as augmented reality, virtual reality, ultra high definition (3D) video and mobile cloud. The further development of the mobile Internet will bring about a thousand times increase in mobile traffic in the future and promote a new round of changes in mobile communication technologies and industries. The Internet of Things (IoT) has expanded the scope of services of mobile communication, from human-to-human communication to intelligent interconnection between people and things as well as between things and things, which makes the mobile communication technologies penetrate into a wider range of industries and fields. In the future, mobile medical, Internet of vehicles, smart home, industrial control, environmental monitoring and the like will promote explosive growth of IoT applications, and hundreds of billions of devices will access a network to achieve real "Internet of Everything". Moreover, connection of massive devices and diverse IoT services will also bring a new technical challenge to the mobile communication.

With continuous emergence and enrichment of new service requirements, higher performance demands, such as higher peak rate, larger user experience rate, smaller delay, higher reliability, higher spectral efficiency and higher energy efficiency, are placed on future mobile communication systems. More user accesses need to be supported, and various types of services are used. In order to support connection of a large number of all types of terminals and different service types, flexible configuration of uplink and downlink resources has become a major trend in technology development. Future system resources may be divided into different sub-bands according to different services, and TTIs (Transmission Time Intervals) with different lengths are allocated on the sub-bands to meet various service requirements.

An existing LTE (Long Term Evolution) FDD (Frequency Division Duplexing) system uses FS1 (Frame Structure Type 1), and its structure is as shown in FIG. 1. In the FDD system, uplink and downlink transmissions use different carrier frequencies and use the same frame structure. On each carrier, a radio frame having a length of 10 ms contains ten 1 ms sub-frames, each of which is divided into two time slots having a length of 0.5 ms. A TTI duration of uplink and downlink data transmission is 1 ms.

An existing LTE TDD (Time Division Duplexing) system uses FS2 (Frame Structure Type 2), and its structure is as shown in FIG. 2. In the TDD system, the uplink and downlink transmissions use different sub-frames or different slots on the same frequency. Each 10 ms radio frame in the FS2 is composed of two 5 ms half-frames, each of which contains five 1 ms sub-frames. The sub-frames in FS2 are classified into three types: downlink sub-frames, uplink sub-frames and special sub-frames. Each special sub-frame is composed of a DwPTS (Downlink Pilot Time Slot), a GP (Guard Period) and an UpPTS (Uplink Pilot Time Slot). The DwPTS may transmit a downlink pilot, downlink service data and a downlink control signaling. The GP does not transmit any signal. The UpPTS only transmits a random access and an SRS (Sounding Reference Symbol) and may not transmit uplink services or uplink control information. Each half-frame contains at least one downlink sub-frame, at least one uplink sub-frame and at most one special sub-frame. The seven uplink and downlink configuration manners supported in the FS2 are as shown in Table 1.

TABLE 1

| Uplink-downlink configuration | | | | | | | | | | | |
|---|---|---|---|---|---|---|---|---|---|---|---|
| Uplink-downlink config-uration | Downlink-to-Uplink Switch-point periodicity | Sub-frame number | | | | | | | | | |
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Control regions and data regions in the existing LTE are divided as follows.

In the existing LTE system, time domain resources occupied by downlink control regions in one sub-frame are the same for all terminals. For example, for a PDCCH (Physical Downlink Control Channel), the time domain resource occupied by a downlink control region is determined by a PCFICH (Physical Control Format Indicator Channel) of a broadcasting channel, and UE (User Equipment) needs to receive its own DCI (Downlink Control Information) within the downlink control region notified by the PCFICH. For an EPDCCH (Enhanced Physical Downlink Control Channel), the downlink control region fully occupies the whole sub-frame in the time domain, and the UE needs to receive its own DCI within a PRB (Physical Resource Block) set configured by RRC (Radio Resource Control). Therefore, in the LTE system, within one TTI, the downlink data channels of all the terminals have a determined time domain start position.

In the existing LTE system, the downlink control regions and the data regions within one TTI are independent of each other in resources. The downlink control channels fully occupy the entire time domain position of the downlink control regions during mapping. The start position in time of the downlink data channel is determined, that is, the downlink data channel starts to perform transmission from a first OFDM (Orthogonal Frequency Division Multiplexing) symbol, except the control region, in the TTI, or starts to perform the transmission from the first OFDM symbols on different frequency domain positions. When a control resource set for transmitting the downlink control channel of each terminal is configured independently, the occupancy of the control resource sets of other terminals cannot be predicted, so that there is no way to handle with the overlapping of a resource occupied by the transmission of the downlink control channel of the terminal and the control resource sets of other terminals, and thus, the downlink data transmission efficiency is relatively low or the reliability is reduced.

SUMMARY

Embodiments of the present disclosure provide a method for determining and configuring a resource for transmitting downlink data, a terminal and a base station in order to solve the technical problem in the prior art that when a control resource set for transmitting a downlink control channel of each terminal is configured independently, the occupancy of control resource sets of other terminals cannot be predicted, so that there is no way to handle with the overlapping of a resource occupied by the transmission of the downlink control channel of the terminal and the control resource sets of other terminals, and thus, the downlink data transmission efficiency is relatively low or the reliability is reduced.

On the first aspect, an embodiment of the present disclosure provides a method for determining a resource for receiving downlink data, applied to a terminal side.

The method includes: based on received resource configuration information transmitted by a base station, determining a first time-frequency resource position of a first resource set or a first resource set group configured for a terminal by the base station for receiving the downlink data; and based on received indication information transmitted by the base station for indicating whether all resource sets or each resource set of the first resource set or all resource set subgroups or each resource set subgroup of the first resource set group are/is used to transmit the downlink data, determining a second time-frequency resource position of a second resource set or a second resource set group for receiving the downlink data, where the first resource set group includes at least one resource set subgroup, and the at least one resource set subgroup includes at least one resource set.

In one embodiment, the indication information includes one of the following information.

Received indication information, transmitted by the base station and carried through a group common PDCCH (Physical Downlink Control Channel) or through UE (User Equipment) specific DCI (Downlink Control Information) which is used to schedule data, for indicating that all the resource sets of the first resource set or all the resource set subgroups of the first resource set group are used to transmit the downlink data.

Or received indication information, transmitted by the base station and carried through the group common PDCCH or through the UE specific DCI which is used to schedule data, for indicating that all the resource sets of the first resource set or all the resource set subgroups of the first resource set group are not used to transmit the downlink data.

Or received bitmap indication information, transmitted by the base station and carried through the group common PDCCH, for indicating resource sets which are not used to transmit the downlink data and resource sets which are used to transmit the downlink data in the first resource set.

Or received bitmap indication information, transmitted by the base station and carried through the group common PDCCH, for indicating resource set subgroups which are not used to transmit the downlink data and resource set subgroups which are used to transmit the downlink data in the first resource set group.

In one embodiment, any resource set in the at least one resource set includes at least one RB (Resource Block) on a frequency domain and at least one OFDM (Orthogonal Frequency Division Multiplexing) symbol on a time domain, or includes at least one CCE (Control Channel Element), or includes at least one CCE group, or includes at least one PRB (Physical Resource Block) group or at least one RE (Resource Element), or includes at least one RE group.

In one embodiment, the at least one resource set subgroup is acquired through received grouping information carried in a high-level signaling transmitted by the base station for grouping at least one resource set.

In one embodiment, the resource configuration information includes: received resource configuration information carried in the high-level signaling transmitted by the base station.

In one embodiment, based on the received indication information transmitted by the base station for indicating whether all the resource sets or each resource set of the first resource set or all the resource set subgroups or each resource set subgroup of the first resource set group are/is used to transmit the downlink data, determining the second time-frequency resource position of the second resource set or the second resource set group for receiving the downlink data, includes one of the following operations.

If the indication information, transmitted by the base station, for indicating that all the resource sets of the first resource set or all the resource set subgroups of the first resource set group are used to transmit the downlink data, is received, determining the second time-frequency resource position of the second resource set or the second resource set group for receiving the downlink data, where the first time-frequency resource position is the same as the second time-frequency resource position.

Or if the indication information, transmitted by the base station, for indicating that all the resource sets of the first resource set or all the resource set subgroups of the first resource set group are not used to transmit the downlink data, is received, determining the second time-frequency resource position of the second resource set or the second resource set group for receiving the downlink data, where the first time-frequency resource position is different from the second time-frequency resource position.

Or if the bitmap indication information, transmitted by the base station, for indicating the resource sets which are not used to transmit the downlink data and the resource sets which are used to transmit the downlink data in the first resource set, is received, determining, based on the bitmap indication information, the second time-frequency resource position of the second resource set for receiving the downlink data, where the second time-frequency resource position includes a time-frequency resource position of a resource set for transmitting the downlink data in the first resource set.

Or if the bitmap indication information, transmitted by the base station, for indicating the resource set subgroups which are not used to transmit the downlink data and the resource set subgroups which are used to transmit the downlink data in the first resource set group, is received, determining, based on the bitmap indication information, the second time-frequency resource position of the second resource set group for receiving the downlink data, where the second time-frequency resource position includes a time-frequency resource position of a resource set subgroup for transmitting the downlink data in the first resource set group.

On the second aspect, an embodiment of the present disclosure provides a method for configuring a resource for transmitting downlink data, applied to a base station side.

The method includes: transmitting resource configuration information to a terminal to enable the terminal to acquire a first time-frequency resource position of a first resource set or a first resource set group for receiving the downlink data; and transmitting indication information, for indicating whether all resource sets or each resource set of the first resource set or all resource set subgroups or each resource set subgroup of the first resource set group are/is used to transmit the downlink data, to the terminal to enable the terminal to determine, according to the indication information, a second time-frequency resource position of a second resource set or a second resource set group for receiving the downlink data, where the first resource set group includes at least one resource set subgroup, and the at least one resource set subgroup includes at least one resource set.

In one embodiment, the indication information includes one of the following information.

Indication information, carried through a group common PDCCH or through UE specific DCI which is used to schedule data, for indicating that all the resource sets of the first resource set or the first resource set group are used to transmit the downlink data.

Or indication information, carried through the group common PDCCH or through the UE specific DCI which is used to schedule data, for indicating that all the resource sets of the first resource set or the first resource set group are not used to transmit the downlink data.

Or bitmap indication information, carried through the group common PDCCH, for indicating resource sets which are not used to transmit the downlink data and resource sets which are used to transmit the downlink data in the first resource set.

Or bitmap indication information, carried through the group common PDCCH, for indicating resource set subgroups which are not used to transmit the downlink data and resource set subgroups which are used to transmit the downlink data in the first resource set group.

In one embodiment, any resource set in the at least one resource set includes at least one RB on a frequency domain and at least one OFDM symbol on a time domain, or includes at least one CCE, or includes at least one CCE group, or includes at least one PRB group or at least one RE, or includes at least one RE group.

In one embodiment, the at least one resource set subgroup is acquired through grouping information carried in a high-level signaling transmitted to the terminal for grouping at least one resource set.

In one embodiment, the resource configuration information includes: resource configuration information carried in the high-level signaling transmitted to the terminal.

In one embodiment, transmitting the indication information for indicating whether all resource sets or each resource set of the first resource set or all resource set subgroups or each resource set subgroup of the first resource set group are/is used to transmit the downlink data to enable the terminal to determine, according to the indication information, the second time-frequency resource position of the second resource set or a second resource set group for receiving the downlink data, includes one of the following operations.

Transmitting the indication information, for indicating that all the resource sets of the first resource set or the first resource set group are not used to transmit the downlink data, to the terminal to enable the terminal to determine, according to the indication information, the second time-frequency resource position of the second resource set or the second resource set group for receiving the downlink data, where the first time-frequency resource position is different from the second time-frequency resource position.

Or transmitting the indication information, for indicating that all the resource sets of the first resource set or the first resource set group are used to transmit the downlink data, to the terminal to enable the terminal to determine, according to the indication information, the second time-frequency resource position of the second resource set or the second resource set group for receiving the downlink data, where the first time-frequency resource position is the same as the second time-frequency resource position.

Or transmitting the bitmap indication information, for indicating that the resource sets which are not used to transmit the downlink data and the resource sets which are used to transmit the downlink data in the first resource set, to the terminal to enable the terminal to determine, according to the indication information, the second time-frequency resource position of the second resource set for receiving the downlink data, where the second time-frequency resource position includes a time-frequency resource position of a resource set for transmitting the downlink data in the first resource set.

Or transmitting the bitmap indication information, for indicating the resource set subgroups which are not used to transmit the downlink data and the resource set subgroups which are used to transmit the downlink data in the first resource set group, to the terminal to enable the terminal to determine, according to the indication information, the second time-frequency resource position of the second resource set or the second resource set group for receiving the downlink data, where the second time-frequency resource position includes a time-frequency resource position of a resource set subgroup for transmitting the downlink data in the first resource set group.

On the third aspect, an embodiment of the present disclosure provides a terminal. The terminal includes a first determination module and a second determination module.

A first determination module is configured to determine, based on received resource configuration information transmitted by a base station, a first time-frequency resource position of a first resource set or a first resource set group configured for the terminal by the base station for receiving the downlink data.

A second determination module is configured to determine, based on received indication information transmitted by the base station for indicating whether all resource sets or each resource set of the first resource set or all resource set subgroups or each resource set subgroup of the first resource set group are/is used to transmit the downlink data, a second time-frequency resource position of a second resource set or a second resource set group for receiving the downlink data, where the first resource set group includes at least one resource set subgroup, and the at least one resource set subgroup includes at least one resource set.

In one embodiment, the indication information includes one of the following information.

Received indication information, transmitted by the base station and carried through a group common PDCCH or through UE specific DCI which is used to schedule data, for indicating that all the resource sets of the first resource set or all the resource set subgroups of the first resource set group are used to transmit the downlink data.

Or received indication information, transmitted by the base station and carried through the group common PDCCH or through the UE specific DCI which is used to schedule data, for indicating that all the resource sets of the first resource set or all the resource set subgroups of the first resource set group are not used to transmit the downlink data.

Or received bitmap indication information, transmitted by the base station and carried through the group common PDCCH, for indicating resource sets which are not used to transmit the downlink data and resource sets which are used to transmit the downlink data in the first resource set.

Or received bitmap indication information, transmitted by the base station and carried through the group common PDCCH, for indicating resource set subgroups which are not used to transmit the downlink data and resource set subgroups which are used to transmit the downlink data in the first resource set group.

In one embodiment, any resource set in the at least one resource set includes at least one RB on a frequency domain and at least one OFDM symbol on a time domain, or includes at least one CCE, or includes at least one CCE group, or includes at least one PRB group or at least one RE, or includes at least one RE group.

In one embodiment, the at least one resource set subgroup is acquired through received grouping information carried in a high-level signaling transmitted by the base station for grouping at least one resource set.

In one embodiment, the resource configuration information includes: received resource configuration information carried in the high-level signaling transmitted by the base station.

In one embodiment, the second determination module includes: a first determination sub-module, a second determination sub-module, a third determination sub-module and fourth determination sub-module.

The first determination sub-module is configured to determine the second time-frequency resource position of the second resource set or the second resource set group for receiving the downlink data if the indication information, transmitted by the base station, for indicating that all the resource sets of the first resource set or all the resource set subgroups of the first resource set group are used to transmit the downlink data, is received, where the first time-frequency resource position is the same as the second time-frequency resource position.

The second determination sub-module is configured to determine the second time-frequency resource position of the second resource set or the second resource set group for receiving the downlink data if the indication information, transmitted by the base station, for indicating that all the resource sets of the first resource set or all the resource set subgroups of the first resource set group are not used to transmit the downlink data, is received, where the first time-frequency resource position is different from the second time-frequency resource position.

The third determination sub-module is configured to determine, based on the bitmap indication information, the second time-frequency resource position of the second resource set for receiving the downlink data if the bitmap indication information, transmitted by the base station, for indicating the resource sets which are not used to transmit the downlink data and the resource sets which are used to transmit the downlink data in the first resource set, is received, where the second time-frequency resource position includes a time-frequency resource position of a resource set for transmitting the downlink data in the first resource set.

The fourth determination sub-module is configured to determine, based on the bitmap indication information, the second time-frequency resource position of the second resource set group for receiving the downlink data if the bitmap indication information, transmitted by the base station, for indicating the resource set subgroups which are not used to transmit the downlink data and the resource set subgroups which are used to transmit the downlink data in the first resource set group, is received, where the second time-frequency resource position includes a time-frequency resource position of a resource set subgroup for transmitting the downlink data in the first resource set group.

On the fourth aspect, an embodiment of the present disclosure provides a base station. The base station includes a first transmission module and a second transmission module.

The first transmission module is configured to transmit resource configuration information to a terminal to enable the terminal to acquire a first time-frequency resource position of a first resource set or a first resource set group for receiving the downlink data.

The second transmission module is configured to transmit indication information for indicating whether all resource sets or each resource set of the first resource set or all resource set subgroups or each resource set subgroup of the first resource set group are/is used to transmit the downlink data to the terminal to enable the terminal to determine, according to the indication information, a second time-frequency resource position of a second resource set or a second resource set group for receiving the downlink data, where the first resource set group includes at least one resource set subgroup, and the at least one resource set subgroup includes at least one resource set.

In one embodiment, the indication information includes one of the following information.

Indication information, carried through a group common PDCCH or through UE specific DCI which is used to schedule data, for indicating that all the resource sets of the first resource set or the first resource set group are used to transmit the downlink data.

Or indication information, carried through the group common PDCCH or through the UE specific DCI which is used to schedule data, for indicating that all the resource sets of the first resource set or the first resource set group are not used to transmit the downlink data.

Or bitmap indication information, carried through the group common PDCCH, for indicating resource sets which are not used to transmit the downlink data and resource sets which are used to transmit the downlink data in the first resource set.

Or bitmap indication information, carried through the group common PDCCH, for indicating resource set subgroups which are not used to transmit the downlink data and resource set subgroups which are used to transmit the downlink data in the first resource set group.

In one embodiment, any resource set in the at least one resource set includes at least one RB on a frequency domain and at least one OFDM symbol on a time domain, or includes at least one CCE, or includes at least one CCE group, or includes at least one PRB group or at least one RE, or includes at least one RE group.

In one embodiment, the at least one resource set subgroup is acquired through grouping information carried in a high-level signaling transmitted to the terminal for grouping at least one resource set.

In one embodiment, the resource configuration information includes: resource configuration information carried in the high-level signaling transmitted to the terminal.

In one embodiment, the second transmission module includes: a first transmission sub-module, a second transmission sub-module, a third transmission sub-module and a fourth transmitting sub-module.

A first transmission sub-module is configured to transmit the indication information, for indicating that all the resource sets of the first resource set or the first resource set group are not used to transmit the downlink data, to the terminal to enable the terminal to determine, according to the indication information, the second time-frequency resource position of the second resource set or the second resource set group for receiving the downlink data, where the first time-frequency resource position is different from the second time-frequency resource position.

A second transmission sub-module is configured to transmit the indication information, for indicating that all the resource sets of the first resource set or the first resource set group are used to transmit the downlink data, to the terminal to enable the terminal to determine, according to the indication information, the second time-frequency resource position of the second resource set or the second resource set group for receiving the downlink data, where the first time-frequency resource position is the same as the second time-frequency resource position.

A third transmission sub-module is configured to transmit the bitmap indication information, for indicating the resource sets which are not used to transmit the downlink data and the resource sets which are used to transmit the downlink data in the first resource set, to the terminal to enable the terminal to determine, according to the indication information, the second time-frequency resource position of the second resource set for receiving the downlink data, where the second time-frequency resource position includes a time-frequency resource position of a resource set for transmitting the downlink data in the first resource set.

A fourth transmitting sub-module is configured to transmit the bitmap indication information, for indicating the resource set subgroups which are not used to transmit the downlink data and the resource set subgroups which are used to transmit the downlink data in the first resource set group, to the terminal to enable the terminal to determine, according to the indication information, the second time-frequency resource position of the second resource set or the second resource set group for receiving the downlink data, where the second time-frequency resource position includes a time-frequency resource position of a resource set subgroup for transmitting the downlink data in the first resource set group.

On the fifth aspect, an embodiment of the present disclosure provides a computer apparatus including a processor. The processor is configured to execute computer programs stored in a memory to perform the operations of the methods in the embodiments of the first aspect and the embodiments of the second aspect.

On the sixth aspect, an embodiment of the present disclosure provides a computer readable storage medium storing computer programs. The computer programs are executed by a processor to perform the operations of the methods in the embodiments of the first aspect and the embodiments of the second aspect.

On the seventh aspect, an embodiment of the present disclosure provides a terminal including: a processor, configured to read a program in a memory and perform the following processes: based on received resource configuration information transmitted by a base station, determining a first time-frequency resource position of a first resource set or a first resource set group configured for the terminal by the base station for receiving the downlink data; and based on received indication information transmitted by the base station for indicating whether all resource sets or each resource set of the first resource set or all resource set subgroups or each resource set subgroup of the first resource set group are/is used to transmit the downlink data, determining a second time-frequency resource position of a second resource set or a second resource set group for receiving the downlink data, where the first resource set group includes at least one resource set subgroup, and the at least one resource set subgroup includes at least one resource set; and a transceiver, configured to receive and transmit data under the control of the processor.

On the eighth aspect, an embodiment of the present disclosure provides a base station including: a processor, configured to read a program in a memory and process data according to a requirement of a transceiver; and the transceiver, configured to receive and transmit data under the control of the processor and perform the following processes: transmitting resource configuration information to a terminal to enable the terminal to acquire a first time-frequency resource position of a first resource set or a first resource set group for receiving the downlink data; and transmitting indication information, for indicating whether all resource sets or each resource set of the first resource set or all resource set subgroups or each resource set subgroup of the first resource set group are/is used to transmit the downlink data, to the terminal to enable the terminal to determine, according to the indication information, a second time-frequency resource position of a second resource set or a second resource set group for receiving the downlink data, where the first resource set group includes at least one resource set subgroup, and the at least one resource set subgroup includes at least one resource set.

One or more technical solutions provided in the embodiments of the present disclosure at least have the following technical effects or advantages: by the adoption of the technical solutions in the embodiments of the present disclosure, the utilization rate of the resource for transmitting the downlink data can be increased, and the probability of receiving errors can be reduced, and inconsistency of behaviors of the terminal side and the base station side for transmitting and receiving the data is avoided, thus enhancing the user experience.

DETAILED DESCRIPTION OF THE EMBODIMENTS

To solve the above technical problems, the general thought of technical solutions in embodiments of the present disclosure is as follows.

A method for determining and configuring a resource for transmitting downlink data includes that: based on received resource configuration information transmitted by a base station, a first time-frequency resource position configured for the terminal by the base station for receiving the downlink data is determined; and based on received indication information transmitted by the base station for indicating whether all resource sets or each resource set of the first resource set or all resource set subgroups or each resource set subgroup of the first resource set group are/is used to transmit the downlink data, a second time-frequency resource position of a second resource set or a second resource set group for receiving the downlink data is determined, where the first resource set group includes at least one resource set subgroup, and the at least one resource set subgroup includes at least one resource set.

According to the technical solution in the embodiment of the present disclosure, the base station configures a resource set or resource set subgroup for receiving the downlink data for each terminal, and then, the base station notifies the terminal whether all resource sets or each resource set of the configured resource sets, or all resource set subgroups or each resource set subgroup of the configured resource set subgroups are/is available in a manner of explicit signaling, so that the terminal determines, according to the notification, a time-frequency resource position of a resource for receiving the downlink data, and thus, the terminal may perform rate matching on the determined resource.

In order to better understand the above technical solution, the above technical solution will be described in detail below in combination with the accompanying drawings and specific implementation manners of the present disclosure.

Figure 1:
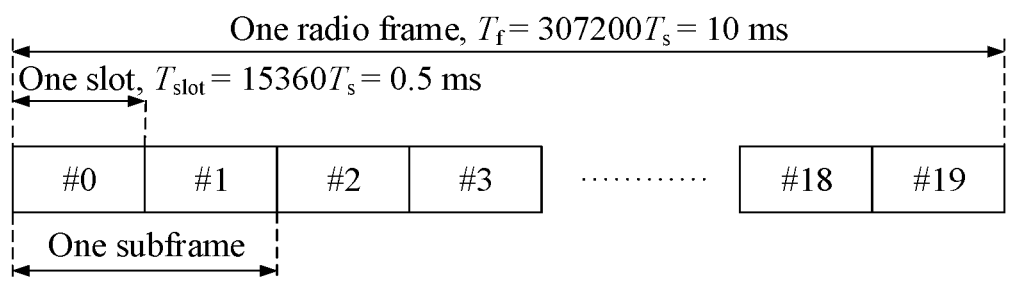
FIG. 1 is a schematic diagram of a frame structure used in an LTE (Long Term Evolution) FDD (Frequency Division Duplexing) system in the related art.
Figure 2:
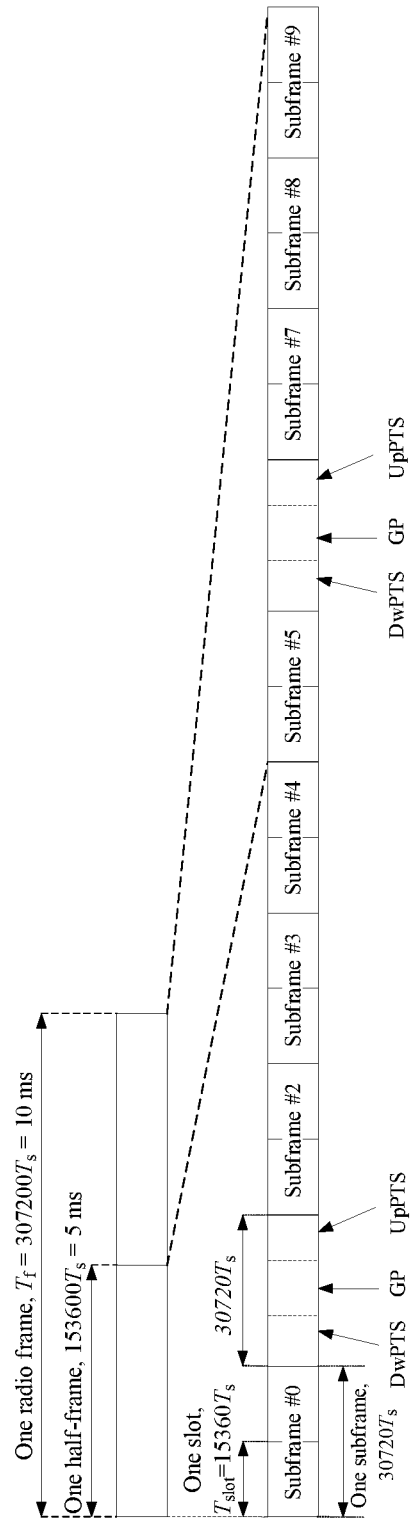
FIG. 2 is a schematic diagram of a frame structure used in an LTE TDD (Time Division Duplexing) system in the related art.
Figure 3:
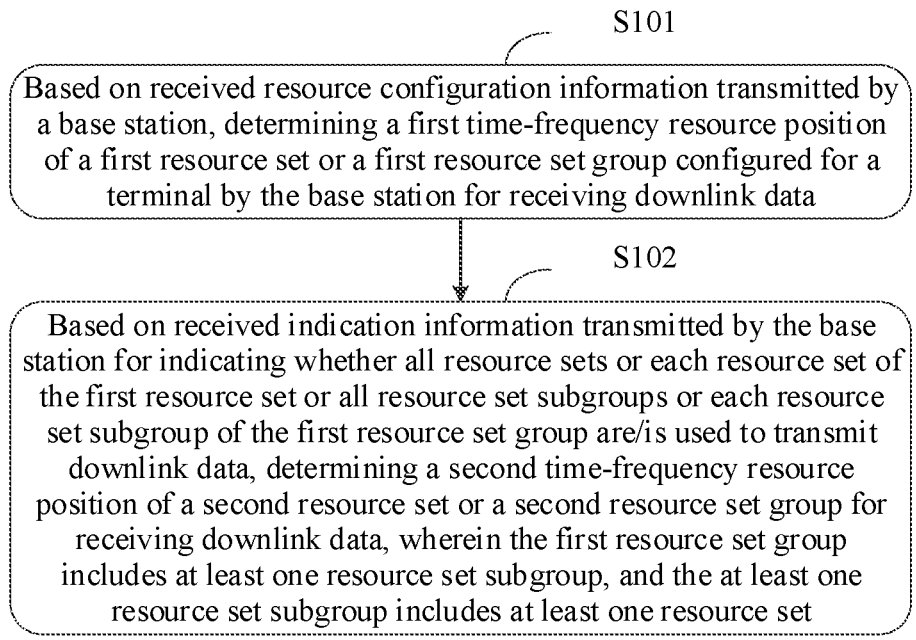
FIG. 3 is a flow diagram of a method for determining a resource for receiving downlink data, provided by an embodiment of the present disclosure.

As shown in FIG. 3, the embodiment I of the present disclosure provides a method for determining a resource for receiving downlink data, applied to a terminal side. The method includes the following operations.

S101, based on received resource configuration information transmitted by a base station, a first time-frequency resource position of a first resource set or a first resource set group configured for a terminal by the base station for receiving the downlink data is determined.

S102, based on received indication information transmitted by the base station for indicating whether all resource sets or each resource set of the first resource set or all resource set subgroups or each resource set subgroup of the first resource set group are/is used to transmit the downlink data, a second time-frequency resource position of a second resource set or a second resource set group for receiving the downlink data is determined, where the first resource set group includes at least one resource set subgroup, and the at least one resource set subgroup includes at least one resource set.

For S101, the resource configuration information may be received resource configuration information carried in a high-level signaling transmitted by the base station. The terminal side may acquire, according to the resource configuration information, the time-frequency resource position of the first resource set or the first resource set group configured for the terminal by the base station for receiving the downlink data. For example, after receiving the resource configuration information carried in the high-level signaling, the terminal acquires the time-frequency resource position of the first resource set or the first resource set group configured for the terminal by the base station for receiving the downlink data.

Specifically, the first resource set or the first resource set group is a resource set or a resource set group reserved for the terminal by the base station and possibly used to transmit the downlink data (such as a downlink control channel).

Any resource set in the at least one resource set may include at least one RB (Resource Block) on a frequency domain and at least one OFDM (Orthogonal Frequency Division Multiplexing) symbol on a time domain, or includes at least one CCE (Control Channel Element), or includes at least one CCE group, or includes at least one PRB (Physical Resource Block) group or at least one RE (Resource Element), or includes at least one RE group.

The first resource set group includes at least one resource set subgroup. The at least one resource set subgroup includes at least one resource set. In the similar way, any resource set in the at least one resource set may include at least one RB on the frequency domain and at least one OFDM symbol on the time domain, or include at least one CCE, or include at least one CCE group, or include at least one PRB group or at least one RE, or include at least one RE group. Specific constitution of any resource set is just an example, but is not limited to the above several constituting manners. Any resource set may also consist of resources with other granularities.

The at least one resource set subgroup is acquired through received grouping information carried in the high-level signaling transmitted by the base station for grouping at least one resource set. Specifically, for example, in addition to the resource configuration information carried in the high-level signaling transmitted by the base station to the terminal, if a resource configured to the terminal in the resource configuration information is a resource set subgroup, the base station may group the at least one resource set according to an actual need, and each resource set subgroup at least includes one resource set. The high-level signaling may carry the grouping information for grouping the at least one resource set. The terminal may acquire, according to the received resource configuration information and grouping information carried in the high-level signaling, the time-frequency resource position of the resource configured by the base station. Of course, as another case, the resource configuration information may also include the grouping information for the resource configured for the terminal by the base station, in addition to the time-frequency resource position of the resource (such as the resource set or the resource set subgroup) configured for the terminal by the base station.

After S101 is executed, S102 is executed. For S102, carrying of the indication information may include the following several different implementation manners.

Manner 1: indication information received by the terminal is transmitted by the base station and carried through a group common PDCCH. Specifically, the indication information carried through the group common PDCCH indicates whether all the resource sets or each resource set of resource sets or all the resource set subgroups or each resource set subgroup of resource set subgroups configured by the base station within one or more slots are/is used to transmit data.

Manner 2: indication information received by the terminal is transmitted by the base station and carried through UE specific DCI which is used to schedule data. Specifically, the indication information carried through the UE specific DCI indicates whether all the resource sets of resource sets or all the resource set subgroups of resource set subgroups configured by the base station within one or more slots are used to transmit data.

For manner 1, the indication information may include the following several implementation manners.

Manner 1a: received indication information transmitted by the base station, carried through the group common PDCCH for indicating that all the resource sets of the first resource set or all the resource set subgroups of the first resource set group are used to transmit the downlink data; received indication information transmitted by the base station and carried through the group common PDCCH, for indicating that all the resource sets of the first resource set or all the resource set subgroups of the first resource set group are not used to transmit the downlink data.

Manner 1b: received bitmap indication information transmitted by the base station and carried through the group common PDCCH, for indicating resource sets which are not used to transmit the downlink data and resource sets which are used to transmit the downlink data in the first resource set.

Manner 1c: received bitmap indication information transmitted by the base station and carried through the group common PDCCH, for indicating resource set subgroups which are not used to transmit the downlink data and resource set subgroups which are used to transmit the downlink data in the first resource set group.

For manner 1a, S102 specifically includes that: if the indication information, transmitted by the base station, for indicating that all the resource sets of the first resource set or all the resource set subgroups of the first resource set group are used to transmit the downlink data, is received, the second time-frequency resource position of the second resource set or the second resource set group for receiving the downlink data is determined, where the first time-frequency resource position is the same as the second time-frequency resource position; if the indication information, transmitted by the base station, for indicating that all the resource sets of the first resource set or all the resource set subgroups of the first resource set group are not used to transmit the downlink data, is received, the second time-frequency resource position of the second resource set or the second resource set group for receiving the downlink data is determined, where the first time-frequency resource position is different from the second time-frequency resource position.

Specifically, it is supposed that the indication information carried through the group common PDCCH is 1 bit of indication information, the indication information indicates a time-frequency resource, for receiving the downlink data, of the terminal.

The indication information is 1 for representing that all the resource sets of the first resource set or all the resource set subgroups of the first resource set group are used to transmit the downlink data, or 0 for representing that all the resource sets of the first resource set or all the resource set subgroups of the first resource set group are not used to transmit the downlink data.

If the reserved resource configured for the terminal by the base station is the first resource set (or the first resource set group), and the indication information received by the terminal is 1, the terminal determines the resource for receiving the downlink data as the first resource set (or the first resource set group).

If the reserved resource configured for the terminal by the base station is the first resource set (or the first resource set group), and the indication information received by the terminal is 0, the terminal determines the resources for receiving the downlink data as other resource sets (or resource set subgroups) except the first resource set (or the first resource set group).

Then, the terminal performs rate matching on the determined resource sets (or resource set subgroups).

For manner 1b and manner 1c, the indication information carried in the group common PDCCH indicates a resource position for transmitting the downlink data in a bitmap manner, and the indication information is bitmap indication information. Thus, S102 includes that: if the bitmap indication information, transmitted by the base station, for indicating the resource sets which are not used to transmit the downlink data and the resource sets which are used to transmit the downlink data in the first resource set, is received, the second time-frequency resource position of the second resource set for receiving the downlink data is determined based on the bitmap indication information, where the second time-frequency resource position includes a time-frequency resource position of a resource set for transmitting the downlink data in the first resource set; if the bitmap indication information, transmitted by the base station, for indicating the resource set subgroups which are not used to transmit the downlink data and the resource set subgroups which are used to transmit the downlink data in the first resource set group, is received, the second time-frequency resource position of the second resource set group for receiving the downlink data is determined based on the bitmap indication information, where the second time-frequency resource position includes a time-frequency resource position of a resource set subgroup for transmitting the downlink data in the first resource set group.

Specifically, the bitmap indication information is specifically, for example, a bitmap. The data length of the bitmap is determined according to the number of the resource sets or the number of the resource set subgroups configured for the terminal by the base station through the high-level signaling. For example, if the number of the resource sets or the number of the resource set subgroups configured for the terminal by the base station through the high-level signaling is Q, the bitmap consists of Q bits, and each bit corresponds to one resource set or one resource set subgroup. For example, the state of the bitmap is 8 bits of 01 000 100, which indicates that the first resource set (or the first resource set group) configured for the terminal by the base station through the high-level signaling is {1, 2, 3, 4, 5, 6, 7, 8}, and the highest bit of the bitmap indicates the resource set No. 1, and so on, so that the lowest bit of the bitmap indicates the resource set No. 8, where 1 represents that this resource set is available, and 0 represents that this resource set is unavailable. Therefore, the state of the bitmap denotes that the terminal may use the resource set No. 2 and the resource set No. 6 to receive the downlink data.

Further, when the terminal does not successfully receive the group common PDCCH or is configured by the base station not to detect and receive the group common PDCCH, the terminal receives the data according to a specific behavior. Specifically, it can be considered that all the resource sets or all the resource set subgroups configured through the high-level signaling are used to transmit the downlink data. Or, it can be considered that all the resource sets or all the resource set subgroups configured through the high-level signaling are not used to transmit the downlink data.

For manner 2, implementation manners of the indication information may be as follows: received indication information transmitted by the base station and carried through the UE specific DCI which is used to schedule data, for indicating that all the resource sets of the first resource set or the first resource set group are used to transmit the downlink data; received indication information transmitted by the base station and carried through the UE specific DCI which is used to schedule data, for indicating that all the resource sets of the first resource set or the first resource set group are not used to transmit the downlink data.

For manner 2, S102 includes that: if the indication information, transmitted by the base station, for indicating that all the resource sets of the first resource set or the first resource set group are used to transmit the downlink data, is received, the second time-frequency resource position of the second resource set or the second resource set group for receiving the downlink data is determined, where the first time-frequency resource position is the same as the second time-frequency resource position; if the indication information, transmitted by the base station, for indicating that all the resource sets of the first resource set or the first resource set group are not used to transmit the downlink data, is received, the second time-frequency resource position of the second resource set or the second resource set group for receiving the downlink data is determined, where the first time-frequency resource position is different from the second time-frequency resource position.

Specifically, it is supposed that the indication information carried through the UE specific DCI which is used to schedule data is 1 bit of indication information, and the indication information may indicate a time-frequency resource, for receiving the downlink data, of the terminal in a bitmap manner of 1 bit or other manners.

The indication information is 1 for representing that all the resource sets of the first resource set or all the resource set subgroups of the first resource set group are used to transmit the downlink data, or 0 for representing that all the resource sets of the first resource set or all the resource set subgroups of the first resource set group are not used to transmit the downlink data.

If the reserved resource configured for the terminal by the base station is the first resource set (or the first resource set group), and the indication information received by the terminal is 1, the terminal determines the resource for receiving the downlink data as the first resource set (or the first resource set group).

If the reserved resource configured for the terminal by the base station is the first resource set (or the first resource set group), and the indication information received by the terminal is 0, the terminal determines the resources for receiving the downlink data as other resource sets (or resource set subgroups) except the first resource set (or the first resource set group).

In order to better understand the present embodiments, an implementation manner of the method for determining the resource for receiving the downlink data is specifically illustrated based on the above several implementation manners of the indication information.

Implementation manner 1: it is supposed that there are totally three UE in a system, i.e., UE1, UE2 and UE3. The base station configures three CORESETs (C1, C2 and C3) for the UE1. The base station configures two CORESETs for the UE2. The base station configures four CORESETs for the UE3. Furthermore, it is supposed that the terminals UE1, UE2 and UE3 form one UE group capable of receiving the same group common PDCCH. The base station further configures resource sets for transmitting other terminal control channels through a high-level signaling after configuring the CORESETs corresponding to a downlink control channel for each terminal. The first resource set configured for the terminal by the base station may be one or more CORESETs, or may be a smaller resource granularity than the CORESET, such as a PRB or PRB group or CCE or CCE group. The first resource set group configured for the terminal by the base station may include one or more resource set subgroups. Any resource set subgroup may include one or more CORESETs, and similarly, may also be a smaller resource granularity than the CORESET. The present disclosure is not limited thereto. In the present embodiment, it is supposed that the resource sets are different CORESETs of different terminals.

Figure 4:
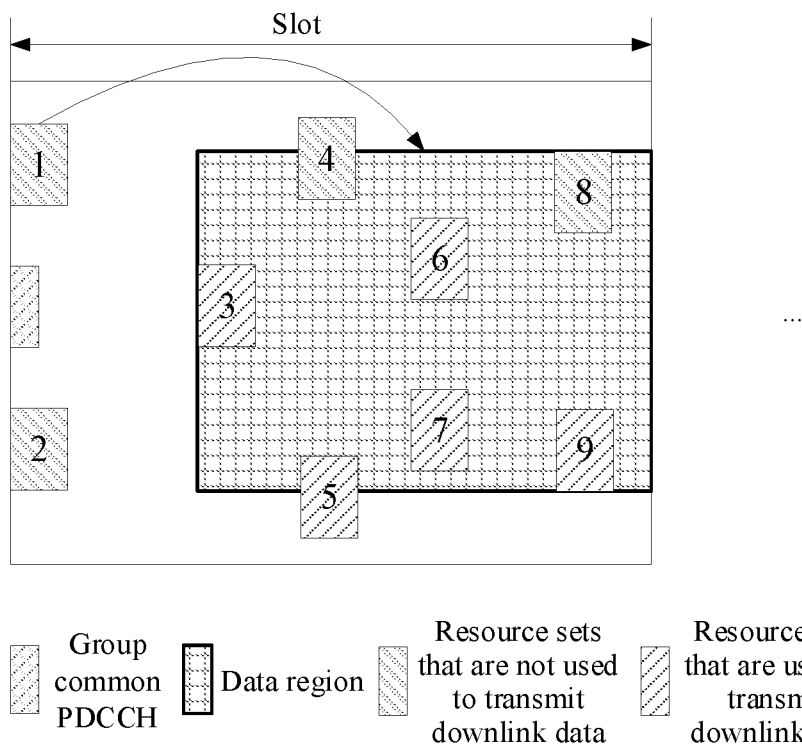
FIG. 4 is a first schematic diagram of a resource for transmitting downlink data, provided by an embodiment of the present disclosure.

The present embodiment illustrates the technical solutions of the present disclosure by taking the UE1 as an example. The UE1 receives a high-level signaling to receive resource set configuration information carried in the high-level signaling. In this example, a base station configures 9 resource sets for the UE1 through the high-level signaling, and the resource sets herein are CORESETs of different terminals. The downlink control channel of data channels of the UE1 is scheduled and transmitted in the CORESET1, and a data region thereof includes a plurality of CORESETs of other terminals. Before receiving data, the base station determines, according to the indication information carried in the group common PDCCH, CORESETs configured by which high-level signalings may be to be used to transmit data. The indication information is a bitmap having a length of 9 bit, and each piece of the information corresponds to a specific CORESET. As shown in FIG. 4, for example, the highest bit of the bitmap indicates whether the CORESET No. 1 as shown in FIG. 4 is used to transmit the downlink data, and the second bit indicates whether the CORESET No. 2 as shown in FIG. 4 is used to transmit the downlink data, and so on, and the lowest bit indicates whether the CORESET No. 9 as shown in FIG. 4 is used to transmit the downlink data. The following figure is taken as an example. The state of the bitmap is 001011101, that is, the resources {3 5 6 7 9} are used to transmit the downlink data, and the CORESET {1 2 4 8} are not used to transmit the downlink data. A PDSCH (Physical Downlink Shared Channel) needs to perform the rate matching according to the four CORESETs.

Further, the reserved resource set configured by RRC for each terminal in the same terminal group should be the same, and the serial numbers should be unified. For example, the resource sets are numbered in a manner of the frequency domain first and then the time domain. Of course, other numbering manners are not excluded.

Further, the indication information carried through the group common PDCCH indicates whether the resource sets configured by the high level in one or more slots are used to transmit the data. Similarly, the time-frequency resource position of the resource set in each slot of the plurality of slots may be the same or different.

Implementation manner 2.

As mentioned in implementation manner 1, it is supposed that there are totally three UE in the system, i.e., UE1, UE2 and UE3. The base station configures three CORESETs (C1, C2 and C3) for the UE1. The base station configures two CORESETs for the UE2. The base station configures four CORESETs for the UE3. Furthermore, it is supposed that the terminals UE1, UE2 and UE3 form one UE group capable of receiving the same group common PDCCH. In the present embodiment, the base station selects and configures partial CORESETS to each terminal as reserved resource sets and realizes indication through the indication information carried by the group common PDCCH. The indication is 1 for representing that all the resource sets of the reserved resource set are used to transmit the downlink data, or 0 for representing that all the resource sets of the reserved resource set are not used to transmit the downlink data. For example, FIG. 4 is taken as an example. The base station selects the CORESETs {1 3 5 7 9} as the reserved resources, notifies time-frequency domain resource information of each CORESET to the terminal through an RRC signaling and further realizes indication through the group common PDCCH (the indication information is 1 or 0).

Implementation manner 3.

As mentioned in implementation manner 1, it is supposed that there are totally three UE in the system, i.e., UE1, UE2 and UE3. The base station configures the same reserved resource set to the UE1, the UE2 and the UE3 respectively. For example, the first resource set is configured to the UE1, the UE2 and the UE3 respectively. The first resource set includes eight resource sets {1 2 3 4 5 6 7 8}. In this example, each resource set (which may be a CORESET) may include at least one PRB group or include at least one CCE group or at least one resource with other granularities, and furthermore, the number of the CCE groups or PRB groups included in each resource set is unrelated to the size of a resource occupied by the CORESET used to transmit the downlink control channel. Moreover, the rate matching indication information (such as the bitmap in implementation manner 1) carried on the group common PDCCH indicates which resource sets are used to transmit the data.

Implementation manner 4.

Figure 5:
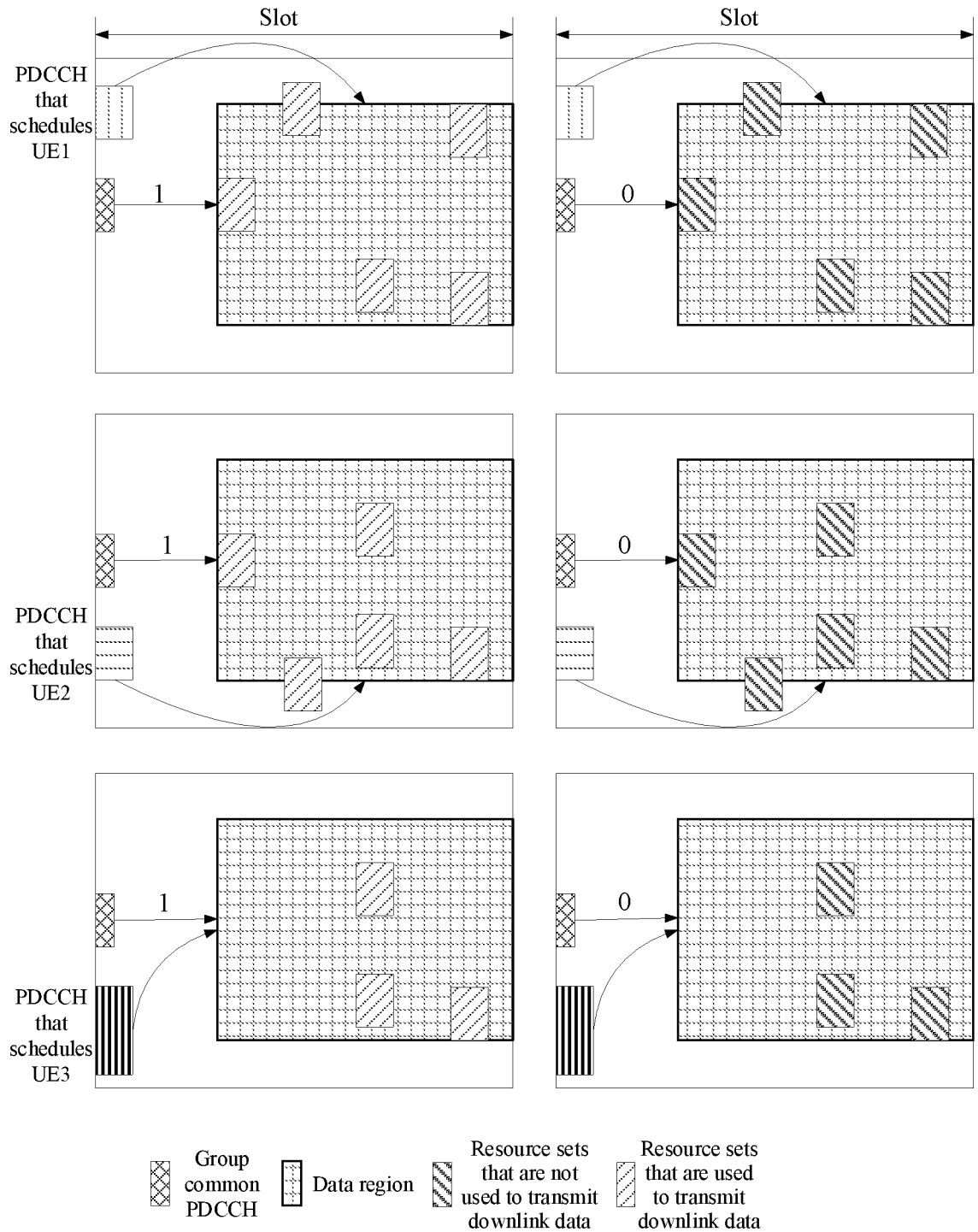
FIG. 5 is a second schematic diagram of a resource for transmitting downlink data, provided by an embodiment of the present disclosure.

It is supposed that there are three UE in the system. The first resource set configured for each terminal by the base station through the high-level signaling includes one or more reserved resource sets. The base station indicates, through the indication information carried on the group common PDCCH, whether the resource sets configured through the high-level signaling are used to transmit the downlink data. In the present embodiment, the indication information carried on the group common PDCCH includes 1 bit information. When the state of the indication bit is 1, it represents that all the resource sets configured through the high-level signaling are used to transmit the downlink data. When the state of the indication bit is 0, it represents that all the resource sets configured through the high-level signaling are not used to transmit the downlink data. If the indication information is 0, the terminal needs to determine other resource sets used to transmit the downlink data in addition to the above resource sets, and then performs the rate matching. In this example, the reserved resource sets configured for each terminal by the base station through the high-level signaling may be the same or different, as shown in FIG. 5.

In addition, the meanings of the resource sets in this implementation manner are as mentioned in the implementation manners 1 to 3. That is, they may be the CORESETs, or may be other resource sets composed of other resource granularities, there are no limits herein.

Implementation manner 5: it is supposed that there are three UE in the system. The first resource set configured for each terminal by the base station through the high-level signaling includes one or more reserved resource sets. The base station indicates, through the indication information carried on the DCI transmitted by the scheduling UE data, whether the resource sets configured through the high-level signaling are used to transmit the downlink data. In the present embodiment, the indication information carried in the scheduling DCI is composed of 1 bit information. When the state of the indication bit is 1, it represents that all the resource sets of the first resource set configured through the high-level signaling are used to transmit the downlink data. When the state of the indication bit is 0, it represents that all the resource sets of the first resource set configured through the high-level signaling are not used to transmit the downlink data. If the indication information is 0, the terminal needs to determine other resource sets used to transmit the downlink data in addition to the first resource set, and then, the PDSCH needs to perform the rate matching on the re-determined resource sets. In this example, the reserved resource sets configured for each terminal by the base station through the high-level signaling may be the same or different, as shown in FIG. 5.

In addition, the meanings of the resource sets in this implementation manner are as mentioned in the implementation manners 1 to 3. That is, they may be the CORESETs, or may be other resource sets composed of other resource granularities, there are no limits herein.

For the implementation manners of the resource set subgroups, one resource subgroup may include at least one resource set subgroup, and one resource set subgroup may include at least one resource set. The indication manners for the resource set subgroups are the same as those for the resource sets. For example, for the resource set subgroups {1 2 3 4 5 6 7 8} No. 1 to 8 in the resource set subgroups, the bitmap 00101110 may indicate which resource groups in the resource set subgroups are available. For example, the highest bit of the bitmap indicates whether the CORESET No. 1 is used to transmit the downlink data, and the second bit indicates whether the CORESET No. 2 is used to transmit the downlink data, and so on, and the lowest bit indicates whether the CORESET No. 8 is used to transmit the downlink data, where 1 indicates availability, and 0 indicates unavailability. The bitmap indicates that the resources No. {3 5 6 7} are used to transmit the downlink data and the CORESETs {1 2 4 8} are not used to transmit the downlink data. The implementation manner of the resource set subgroups is the same as the principle of the aforementioned implementation manner of the resource sets, and descriptions thereof are omitted herein.

Figure 6:
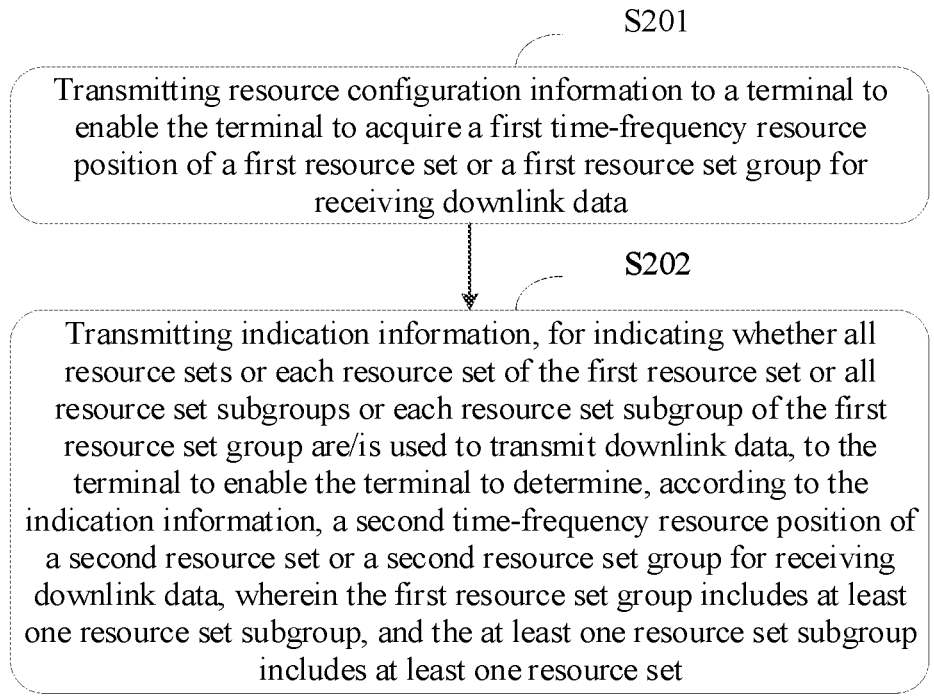
FIG. 6 is a flow diagram of a method for configuring a resource for transmitting downlink data, provided by an embodiment of the present disclosure.

As shown in FIG. 6, the embodiment II of the present disclosure provides a method for configuring a resource for receiving downlink data, applied to a base station side. The method includes the following operations.

S201, resource configuration information is transmitted to a terminal to enable the terminal to acquire a first time-frequency resource position of a first resource set or a first resource set group for receiving the downlink data.

S202, indication information, for indicating whether all resource sets or each resource set of the first resource set or all resource set subgroups or each resource set subgroup of the first resource set group are/is used to transmit the downlink data, is transmitted to the terminal to enable the terminal to determine, according to the indication information, a second time-frequency resource position of a second resource set or a second resource set group for receiving the downlink data, where the first resource set group includes at least one resource set subgroup, and the at least one resource set subgroup includes at least one resource set.

Specifically, the resource configuration information may be resource configuration information carried in a high-level signaling transmitted by the base station. The terminal side may acquire, according to the resource configuration information, the time-frequency resource position of the first resource set or the first resource set group configured for the terminal by the base station for receiving the downlink data. For example, the terminal acquires the time-frequency resource position of the first resource set or the first resource set group configured for the terminal by the base station for receiving the downlink data after receiving the resource configuration information carried in the high-level signaling.

Specifically, the first resource set or the first resource set group is a resource set or a resource set subgroup reserved for the terminal by the base station and possibly used to transmit the downlink data (such as a downlink control channel).

Any resource set in the at least one resource set may include at least one RB on a frequency domain and at least one OFDM symbol on a time domain, or include at least one CCE, or include at least one CCE group, or include at least one PRB group or at least one RE, or include at least one RE group.

The first resource set group includes at least one resource set subgroup. The at least one resource set subgroup includes at least one resource set. In the similar way, any resource set in the at least one resource set may include at least one RB on the frequency domain and at least one OFDM symbol on the time domain, or include at least one CCE, or include at least one CCE group, or include at least one PRB group or at least one RE, or include at least one RE group. Specific constitution of any resource set is just an example, but is not limited to the above several constituting manners. Any resource set may also consist of resources with other granularities.

The at least one resource set subgroup is acquired through received grouping information carried in the high-level signaling transmitted by the base station for grouping at least one resource set. Specifically, for example, in addition to the resource configuration information carried in the high-level signaling transmitted by the base station to the terminal, if a resource configured for the terminal in the resource configuration information is the resource set subgroup, the base station may group the at least one resource set according to an actual need, and each resource set subgroup at least includes one resource set. The high-level signaling may carry the grouping information for grouping the at least one resource set. The terminal may acquire, according to the received resource configuration information and grouping information carried in the high-level signaling, the time-frequency resource position of the resource configured by the base station. Of course, as another case, the resource configuration information may also include the grouping information for the resource configured for the terminal by the base station, in addition to the time-frequency resource position of the resource (such as the resource set or the resource set subgroup) configured for the terminal by the base station.

After S201 is executed, S202 is executed. For S202, carrying of the indication information may include the following several different implementation manners.

Manner 1: indication information transmitted by the base station and carried through the group common PDCCH; specifically, the indication information carried through the group common PDCCH is used to indicate whether all the resource sets or each resource set of the resource sets or all the resource set subgroups or each resource set subgroup of the resource set subgroups configured by the base station within one or more slots are/is used to transmit data.

Manner 2: indication information transmitted by the base station and carried through the UE specific DCI which is used to schedule data; specifically, the indication information carried through the group common PDCCH is used to indicate whether all the resource sets of the resource sets or all the resource set subgroups of the resource set subgroups configured by the base station within one or more slots are used to transmit data.

For manner 1, the indication information may include the following several implementation manners.

Manner 1a: indication information, carried through the group common PDCCH, for indicating that all the resource sets of the first resource set or the first resource set group are used to transmit the downlink data; indication information, carried through the group common PDCCH, for indicating that all the resource sets of the first resource set or the first resource set group are not used to transmit the downlink data.

Manner 1b: bitmap indication information, carried through the group common PDCCH, for indicating resource sets which are not used to transmit the downlink data and resource sets which are used to transmit the downlink data in the first resource set.

Manner 1c: bitmap indication information, carried through the group common PDCCH, for indicating resource set subgroups which are not used to transmit the downlink data and resource set subgroups which are used to transmit the downlink data in the first resource set group.

For manner 1a, S202 specifically includes that: the indication information, for indicating that all the resource sets of the first resource set or the first resource set group are not used to transmit the downlink data, is transmitted to the terminal to enable the terminal to determine, according to the indication information, the second time-frequency resource position of the second resource set or the second resource set group for receiving the downlink data, where the first time-frequency resource position is different from the second time-frequency resource position; the indication information, for indicating that all the resource sets of the first resource set or the first resource set group are used to transmit the downlink data, is transmitted to the terminal to enable the terminal to determine, according to the indication information, the second time-frequency resource position of the second resource set or the second resource set group for receiving the downlink data, where the first time-frequency resource position is the same as the second time-frequency resource position.

Specifically, it is supposed that the indication information carried through the group common PDCCH is 1 bit of indication information, the indication information is used to indicate a time-frequency resource, for receiving the downlink data, of the terminal.

The indication information is 1 for representing that all the resource sets of the first resource set or all the resource set subgroups of the first resource set group are used to transmit the downlink data, or 0 for representing that all the resource sets of the first resource set or all the resource set subgroups of the first resource set group are not used to transmit the downlink data.

If the reserved resource configured for the terminal by the base station is the first resource set (or the first resource set group), and the indication information received by the terminal is 1, the terminal determines the resource for receiving the downlink data as the first resource set (or the first resource set group).

If the reserved resource configured for the terminal by the base station is the first resource set (or the first resource set group), and the indication information received by the terminal is 0, the terminal determines the resources for receiving the downlink data as other resource sets (or resource set subgroups) except the first resource set (or the first resource set group).

Then, the terminal performs rate matching on the determined resource sets (or resource set subgroups).

For manner 1b and manner 1c, the indication information carried in the group common PDCCH indicates a resource position for transmitting the downlink data in a bitmap manner, and the indication information is the bitmap indication information. S202 specifically includes that: the bitmap indication information, for indicating the resource sets which are not used to transmit the downlink data and the resource sets which are used to transmit the downlink data in the first resource set, is transmitted to the terminal to enable the terminal to determine, according to the indication information, the second time-frequency resource position of the second resource set for receiving the downlink data, where the second time-frequency resource position includes a time-frequency resource position of a resource set for transmitting the downlink data in the first resource set; the bitmap indication information, for indicating the resource set subgroups which are not used to transmit the downlink data and the resource set subgroups which are used to transmit the downlink data in the first resource set group, is transmitted to the terminal to enable the terminal to determine, according to the indication information, the second time-frequency resource position of the second resource set or the second resource set group for receiving the downlink data, where the second time-frequency resource position includes a time-frequency resource position of a resource set subgroup for transmitting the downlink data in the first resource set group.

Specifically, the bitmap indication information is specifically, for example, a bitmap. The data length of the bitmap is determined according to the number of the resource sets or the number of the resource set subgroups configured for the terminal by the base station through the high-level signaling. For example, if the number of the resource sets or the number of the resource set subgroups configured for the terminal by the base station through the high-level signaling is Q, the bitmap consists of Q bits, and each bit corresponds to one resource set or one resource set subgroup. For example, the state of the bitmap is 8 bits of 01 000 100, which indicates that the first resource set (or the first resource set group) configured for the terminal by the base station through the high-level signaling is {1, 2, 3, 4, 5, 6, 7, 8}, and the highest bit of the bitmap indicates the resource set No. 1, and so on, so that the lowest bit of the bitmap indicates the resource set No. 8, where 1 denotes that this resource set is available, and 0 denotes that this resource set is unavailable. Therefore, the state of the bitmap denotes that the terminal may use the resource set No. 2 and the resource set No. 6 to receive the downlink data.

Further, when the terminal does not successfully receive the group common PDCCH or is configured by the base station to not detect and receive the group common PDCCH, the terminal receive the data according to a specific behavior. Specifically, it can be considered that all the resource sets or all the resource set subgroups configured through the high-level signaling are used to transmit the downlink data. Or, it can be considered that all the resource sets or all the resource set subgroups configured through the high-level signaling are not used to transmit the downlink data.

For manner 2, implementation manners of the indication information may be as follows: indication information, carried through the UE specific DCI which is used to schedule data, for indicating that all the resource sets of the first resource set or the first resource set group are used to transmit the downlink data; or, indication information, carried through the UE specific DCI which is used to schedule data, for indicating that all the resource sets of the first resource set or the first resource set group are not used to transmit the downlink data.

For manner 2, S202 specifically includes that: the indication information, for indicating that all the resource sets of the first resource set or the first resource set group are not used to transmit the downlink data, is transmitted to the terminal to enable the terminal to determine, according to the indication information, the second time-frequency resource position of the second resource set or the second resource set group for receiving the downlink data, where the first time-frequency resource position is different from the second time-frequency resource position; the indication information, for indicating that all the resource sets of the first resource set or the first resource set group are used to transmit the downlink data, is transmitted to the terminal to enable the terminal to determine, according to the indication information, the second time-frequency resource position of the second resource set or the second resource set group for receiving the downlink data, where the first time-frequency resource position is the same as the second time-frequency resource position.

Specifically, it is supposed that the indication information transmitted by the base station to the terminal and carried through the UE specific DCI which is used to schedule data is 1 bit of indication information, and the indication information may indicate a time-frequency resource, for receiving the downlink data, of the terminal in a bitmap manner of 1 bit or other manners.

The indication information is 1 for representing that all the resource sets of the first resource set or all the resource set subgroups of the first resource set group are used to transmit the downlink data, or 0 for representing that all the resource sets of the first resource set or all the resource set subgroups of the first resource set group are not used to transmit the downlink data.

If the reserved resource configured for the terminal by the base station is the first resource set (or the first resource set group), and the indication information received by the terminal is 1, the terminal determines the resource for receiving the downlink data as the first resource set (or the first resource set group).

If the reserved resource configured for the terminal by the base station is the first resource set (or the first resource set group), and the indication information received by the terminal is 0, the terminal determines the resources for receiving the downlink data as other resource sets (or resource set subgroups) except the first resource set (or the first resource set group).

Embodiments of the method for configuring the resource for transmitting the download data on the base station side are the same as the method of the specific example in the embodiment I, and descriptions thereof are omitted herein.

Figure 7:
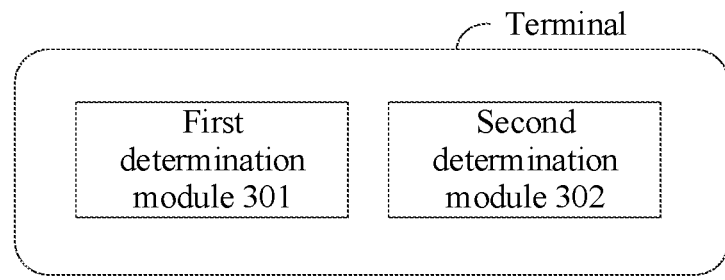
FIG. 7 is a schematic diagram of a terminal provided by an embodiment of the present disclosure.

As shown in FIG. 7, the embodiment III of the present disclosure provides a terminal. The terminal includes a first determination module 301 and a second determination module 302.

The first determination module 301 is configured to determine, based on received resource configuration information transmitted by a base station, a first time-frequency resource position of a first resource set or a first resource set group configured for the terminal by the base station for receiving the downlink data.

The second determination module 302 is configured to determine, based on received indication information transmitted by the base station for indicating whether all resource sets or each resource set of the first resource set or all resource set subgroups or each resource set subgroup of the first resource set group are/is used to transmit the downlink data, a second time-frequency resource position of a second resource set or a second resource set group for receiving the downlink data, where the first resource set group includes at least one resource set subgroup, and the at least one resource set subgroup includes at least one resource set.

The resource configuration information is the same as that in the embodiment I. The constitution of the first resource set or the first resource set group is the same as the resource set or resource set subgroup reserved for the terminal by the base station and possibly used to transmit the downlink data (such as a downlink control channel) in the embodiment I, and descriptions thereof are omitted herein.

The indication information is the same as that in the embodiment I, and descriptions thereof are omitted herein. The time-frequency resource position determined by the second determination module 302 of the terminal is different due to different received indication information. The second determination module 302 includes a first determination sub-module, a second determination sub-module, a third determination sub-module and a fourth determination sub-module.

For the indication information of manner 1a and manner 2 in the embodiment I: the first determination sub-module is configured to determine the second time-frequency resource position of the second resource set or the second resource set group for receiving the downlink data if the indication information, transmitted by the base station, for indicating that all the resource sets of the first resource set or all the resource set subgroups of the first resource set group are used to transmit the downlink data, is received, where the first time-frequency resource position is the same as the second time-frequency resource position; and the second determination sub-module is configured to determine the second time-frequency resource position of the second resource set or the second resource set group for receiving the downlink data if the indication information, transmitted by the base station, for indicating that all the resource sets of the first resource set or all the resource set subgroups of the first resource set group are not used to transmit the downlink data, is received, where the first time-frequency resource position is different from the second time-frequency resource position.

Specifically, it is supposed that the indication information carried through a group common PDCCH or UE specific DCI which is used to schedule data is 1 bit of indication information, and the indication information may indicate a time-frequency resource, for receiving the downlink data, of the terminal in a bitmap manner of 1 bit or other manners.

The indication information is 1 for representing that all the resource sets of the first resource set or all the resource set subgroups of the first resource set group are used to transmit the downlink data, or 0 for representing that all the resource sets of the first resource set or all the resource set subgroups of the first resource set group are not used to transmit the downlink data.

If the reserved resource configured for the terminal by the base station is the first resource set (or the first resource set group), and the indication information received by the terminal is 1, the first determination sub-module determines the resource for receiving the downlink data as the first resource set (or the first resource set group).

If the reserved resource configured for the terminal by the base station is the first resource set (or the first resource set group), and the indication information received by the terminal is 0, the second determination sub-module determines the resource for receiving the downlink data as other resource sets (or resource set subgroups) except the first resource set (or the first resource set group).

Then, the terminal performs rate matching on the determined resource sets (or resource set subgroups).

For the indication information of manner 1b in the embodiment I: the third determination sub-module is configured to determine, based on the bitmap indication information, the second time-frequency resource position of the second resource set for receiving the downlink data if the bitmap indication information, transmitted by the base station, for indicating the resource sets which are not used to transmit the downlink data and the resource sets which are used to transmit the downlink data in the first resource set, is received, where the second time-frequency resource position includes a time-frequency resource position of a resource set for transmitting the downlink data in the first resource set.

For the indication information of the manner 1c in the embodiment I: the fourth determination sub-module is configured to determine, based on the bitmap indication information, the second time-frequency resource position of the second resource set group for receiving the downlink data if the bitmap indication information, transmitted by the base station, for indicating the resource set subgroups which are not used to transmit the downlink data and the resource set subgroups which are used to transmit the downlink data in the first resource set group, is received, where the second time-frequency resource position includes a time-frequency resource position of a resource set subgroup for transmitting the downlink data in the first resource set group.

For the third determination sub-module and the fourth determination sub-module, a specific implementation manner for determining the second time-frequency resource position of the second resource set group for receiving the downlink data is as follows: the bitmap indication information is specifically, for example, a bitmap. The data length of the bitmap is determined according to the number of the resource sets or the number of the resource set subgroups configured for the terminal by the base station through the high-level signaling. For example, if the number of the resource sets or the number of the resource set subgroups configured for the terminal by the base station through the high-level signaling is Q, the bitmap consists of Q bits, and each bit corresponds to one resource set or one resource set subgroup. For example, the state of the bitmap is 8 bits of 01 000 100, which indicates that the first resource set (or the first resource set group) configured for the terminal by the base station through the high-level signaling is {1, 2, 3, 4, 5, 6, 7, 8}, and the highest bit of the bitmap indicates the resource set No. 1, and so on, so that the lowest bit of the bitmap indicates the resource set No. 8, where 1 denotes that this resource set is available, and 0 denotes that this resource set is unavailable. Therefore, the state of the bitmap denotes that the terminal may use the resource set No. 2 and the resource set No. 6 to receive the downlink data.

Further, when the terminal does not successfully receive the group common PDCCH or is configured by the base station to not detect and receive the group common PDCCH, the terminal receive the data according to a specific behavior. Specifically, it can be considered that all the resource sets or all the resource set subgroups configured through the high-level signaling are used to transmit the downlink data. Or, it can be considered that all the resource sets or all the resource set subgroups configured through the high-level signaling are not used to transmit the downlink data.

Method operations of the working principle of the terminal for determining the resource for receiving the downlink data are the same as the specific example in the embodiment I, and descriptions thereof are omitted herein.

Figure 8:
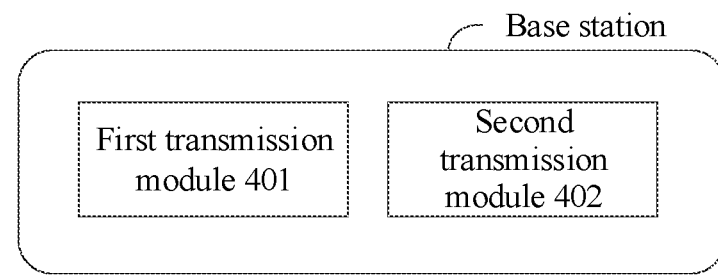
FIG. 8 is a schematic diagram of a base station provided by the embodiment of the present disclosure.

As shown in FIG. 8, the embodiment IV of the present disclosure provides a base station. The base station includes a first transmission module 401 and a second transmission module 402.

The first transmission module 401 is configured to transmit resource configuration information to a terminal to enable the terminal to acquire a first time-frequency resource position of a first resource set or a first resource set group for receiving the downlink data.

The second transmission module 402 is configured to transmit indication information for indicating whether all resource sets or each resource set of the first resource set or all resource set subgroups or each resource set subgroup of the first resource set group are/is used to transmit the downlink data to the terminal to enable the terminal to determine, according to the indication information, a second time-frequency resource position of a second resource set or a second resource set group for receiving the downlink data, where the first resource set group includes at least one resource set subgroup, and the at least one resource set subgroup includes at least one resource set.

The resource configuration information is the same as the resource configuration information in the embodiment II. The constitution of the first resource set or the first resource set group is the same as the resource set or resource set subgroup reserved for the terminal by the base station and possibly configured to transmit the downlink data (such as a downlink control channel) in the embodiment II, and descriptions thereof are omitted herein.

The indication information is the same as that in the embodiment II, and descriptions thereof are omitted herein. The time-frequency resource position determined by terminal is different due to different indication information transmitted by the second transmission module 402 of the base station. The second transmission module 402 specifically includes a first transmission sub-module, a second transmission sub-module, a third transmission sub-module and a fourth transmission sub-module.

for the indication information of manner 1a and manner 2 in the embodiment II: the first transmission sub-module is configured to transmit the indication information, for indicating that all the resource sets of the first resource set or the first resource set group are not used to transmit the downlink data, to the terminal to enable the terminal to determine, according to the indication information, the second time-frequency resource position of the second resource set or the second resource set group for receiving the downlink data, where the first time-frequency resource position is different from the second time-frequency resource position.

The second transmission sub-module is configured to transmit the indication information, for indicating that all the resource sets of the first resource set or the first resource set group are used to transmit the downlink data, to the terminal to enable the terminal to determine, according to the indication information, the second time-frequency resource position of the second resource set or the second resource set group for receiving the downlink data, where the first time-frequency resource position is the same as the second time-frequency resource position.

Specifically, it is supposed that the indication information carried through a group common PDCCH or UE specific DCI which is used to schedule data is 1 bit of indication information, and the indication information may indicate a time-frequency resource, for receiving the downlink data, of the terminal in a bitmap manner of 1 bit or other manners.

The indication information is 1 for representing that all the resource sets of the first resource set or all the resource set subgroups of the first resource set group are used to transmit the downlink data, or 0 for representing that all the resource sets of the first resource set or all the resource set subgroups of the first resource set group are not used to transmit the downlink data.

If the reserved resource configured for the terminal by the base station is the first resource set (or the first resource set group), and the indication information transmitted by the first transmission sub-module to the terminal is 1, the resource for receiving the downlink data of the terminal is the first resource set (or the first resource set group).

If the reserved resource configured for the terminal by the base station is the first resource set (or the first resource set group), and the indication information transmitted by the second transmission sub-module to the terminal is 0, the resource for receiving the downlink data of the terminal is other resource sets (or resource set subgroups) except the first resource set (or the first resource set group).

Then, the terminal performs rate matching on the determined resource sets (or resource set subgroups).

For the indication information of manner 1b in the embodiment II: the third transmission sub-module is configured to transmit the bitmap indication information, for indicating the resource sets which are not used to transmit the downlink data and the resource sets which are used to transmit the downlink data in the first resource set, to the terminal to enable the terminal to determine, according to the indication information, the second time-frequency resource position of the second resource set for receiving the downlink data, where the second time-frequency resource position includes a time-frequency resource position of a resource set for transmitting the downlink data in the first resource set.

For the indication information of manner 1c in the embodiment II: the fourth transmitting sub-module is configured to transmit the bitmap indication information, for indicating the resource set subgroups which are not used to transmit the downlink data and the resource set subgroups which are used to transmit the downlink data in the first resource set group, to the terminal to enable the terminal to determine, according to the indication information, the second time-frequency resource position of the second resource set or the second resource set group for receiving the downlink data, where the second time-frequency resource position includes a time-frequency resource position of a resource set subgroup, which are used to transmit the downlink data, in the first resource set group.

For the third transmission sub-module and the fourth transmission sub-module, a specific implementation manner for determining the second time-frequency resource position of the second resource set group for receiving the downlink data is as follows: the bitmap indication information is specifically, for example, a bitmap. The data length of the bitmap is determined according to the number of the resource sets or the number of the resource set subgroups configured for the terminal by the base station through the high-level signaling. For example, if the number of the resource sets or the number of the resource set subgroups configured for the terminal by the base station through the high-level signaling is Q, the bitmap consists of Q bits, and each bit corresponds to one resource set or one resource set subgroup. For example, the state of the bitmap is 8 bits of 01 000 100. The first resource set (or the first resource set group) configured for the terminal by the base station through the high-level signaling is {1, 2, 3, 4, 5, 6, 7, 8}, and the highest bit of the bitmap is set to indicate the resource set No. 1, and so on, so that the lowest bit of the bitmap indicates the resource set No. 8, where 1 denotes that this resource set is available, and 0 denotes that this resource set is unavailable. Therefore, the state of the bitmap denotes that the terminal may use the resource set No. 2 and the resource set No. 6 to receive the downlink data.

Further, when the terminal does not successfully receive the group common PDCCH or is configured by the base station to not detect and receive the group common PDCCH, the terminal receive the data according to a specific behavior. Specifically, it can be considered that all the resource sets or all the resource set subgroups configured through the high-level signaling are used to transmit the downlink data. Or, it can be considered that all the resource sets or all the resource set subgroups configured through the high-level signaling are not used to transmit the downlink data.

Method operations of the working principle of the base station for determining the resource for transmitting the downlink data are the same as the specific examples in the embodiments I and II, and descriptions thereof are omitted herein.

The embodiment V of the present disclosure provides a computer apparatus including a processor. The processor performs the operations of the methods in the embodiments I and II when executing computer programs stored in a memory.

The embodiment VI of the present disclosure provides a computer readable storage medium storing computer programs. The computer programs are executed by a processor to perform the operations of the methods in the embodiments I and II.

The embodiment VII of the present disclosure provides a terminal including: a processor, configured to read a program in a memory and perform the following process: based on received resource configuration information transmitted by a base station, determining a first time-frequency resource position of a first resource set or a first resource set group configured for a terminal by the base station for receiving the downlink data; and based on received indication information transmitted by the base station for indicating whether all resource sets or each resource set of the first resource set or all resource set subgroups or each resource set subgroup of the first resource set group are are/is to transmit the downlink data, determining a second time-frequency resource position of a second resource set or a second resource set group for receiving the downlink data, where the first resource set group includes at least one resource set subgroup, and the at least one resource set subgroup includes at least one resource set; and a transceiver configured to receive and transmit data under the control of the processor.

In implementation, the indication information includes one of the following information.

Received indication information, transmitted by the base station and carried through a group common PDCCH or through UE specific DCI which is used to schedule data, for indicating that all the resource sets of the first resource set or all the resource set subgroups of the first resource set group are used to transmit the downlink data.

Or received indication information, transmitted by the base station and carried through the group common PDCCH or through the UE specific DCI which is used to schedule data, for indicating that all the resource sets of the first resource set or all the resource set subgroups of the first resource set group are not used to transmit the downlink data Or received bitmap indication information, transmitted by the base station and carried through the group common PDCCH, for indicating resource sets which are not used to transmit the downlink data and resource sets which are used to transmit the downlink data in the first resource set.

Or received bitmap indication information, transmitted by the base station and carried through the group common PDCCH, for indicating resource set subgroups which are not used to transmit the downlink data and resource set subgroups which are used to transmit the downlink data in the first resource set group.

In implementation, any resource set in the at least one resource set includes at least one RB on a frequency domain and at least one OFDM symbol on a time domain, or includes at least one CCE, or includes at least one CCE group, or includes at least one PRB group or at least one RE, or includes at least one RE group.

In implementation, the at least one resource set subgroup is acquired through received grouping information carried in a high-level signaling transmitted by the base station for grouping at least one resource set.

In implementation, the resource configuration information includes: received resource configuration information carried in the high-level signaling transmitted by the base station.

In implementation, the terminal determines the second time-frequency resource position of the second resource set or the second resource set group for receiving the downlink data if the indication information, transmitted by the base station, for indicating that all the resource sets of the first resource set or all the resource set subgroups of the first resource set group are used to transmit the downlink data, is received, where the first time-frequency resource position is the same as the second time-frequency resource position.

Or the terminal determines the second time-frequency resource position of the second resource set or the second resource set group for receiving the downlink data if the indication information, transmitted by the base station, for indicating that all the resource sets of the first resource set or all the resource set subgroups of the first resource set group are not used to transmit the downlink data, is received, where the first time-frequency resource position is different from the second time-frequency resource position.

Or the terminal determines, based on the bitmap indication information, the second time-frequency resource position of the second resource set for receiving the downlink data if the bitmap indication information, transmitted by the base station, for indicating the resource sets which are not used to transmit the downlink data and the resource sets which are used to transmit the downlink data in the first resource set, is received, where the second time-frequency resource position includes a time-frequency resource position of a resource set for transmitting the downlink data in the first resource set.

Or the terminal determines, based on the bitmap indication information, the second time-frequency resource position of the second resource set group for receiving the downlink data if the bitmap indication information, transmitted by the base station, for indicating the resource set subgroups which are not used to transmit the downlink data and the resource set subgroups which are used to transmit the downlink data in the first resource set group, is received, where the second time-frequency resource position includes a time-frequency resource position of a resource set subgroup for transmitting the downlink data in the first resource set group.

The embodiment VIII of the present disclosure provides a base station including: a processor, configured to read a program in a memory and process data according to a requirement of a transceiver; and the transceiver, configured to receive and transmit data under the control of the processor and perform the following processes that: resource configuration information is transmitted to a terminal to enable the terminal to acquire a first time-frequency resource position of a first resource set or a first resource set group for receiving the downlink data; and indication information for indicating whether all resource sets or each resource set of the first resource set or all resource set subgroups or each resource set subgroup of the first resource set group are/is used to transmit the downlink data, is transmitted to the terminal to enable the terminal to determine, according to the indication information, a second time-frequency resource position of a second resource set or a second resource set group for receiving the downlink data, where the first resource set group includes at least one resource set subgroup, and the at least one resource set subgroup includes at least one resource set.

In implementation, the indication information includes one of the following information.

Indication information, carried through a group common PDCCH or through UE specific DCI which is used to schedule data, for indicating that all the resource sets of the first resource set or the first resource set group are used to transmit the downlink data.

Or indication information, carried through the group common PDCCH or through the UE specific DCI which is used to schedule data, for indicating that all the resource sets of the first resource set or the first resource set group are not used to transmit the downlink data.

Or bitmap indication information, carried through the group common PDCCH, for indicating resource sets which are not used to transmit the downlink data and resource sets which are used to transmit the downlink data in the first resource set.

Or bitmap indication information, carried through the group common PDCCH, for indicating resource set subgroups which are not used to transmit the downlink data and resource set subgroups which are used to transmit the downlink data in the first resource set group.

In implementation, any resource set in the at least one resource set includes at least one RB on a frequency domain and at least one OFDM symbol on a time domain, or includes at least one CCE, or includes at least one CCE group, or includes at least one PRB group or at least one RE, or includes at least one RE group.

In implementation, the at least one resource set subgroup is acquired through grouping information carried in a high-level signaling transmitted to the terminal for grouping at least one resource set.

In implementation, the resource configuration information includes: resource configuration information carried in the high-level signaling transmitted to the terminal.

In implementation, the base station transmits the indication information, for indicating that all the resource sets of the first resource set or the first resource set group are not used to transmit the downlink data, to the terminal to enable the terminal to determine, according to the indication information, the second time-frequency resource position of the second resource set or the second resource set group for receiving the downlink data, where the first time-frequency resource position is different from the second time-frequency resource position.

Or the base station transmits the indication information, for indicating that all the resource sets of the first resource set or the first resource set group are used to transmit the downlink data, to the terminal to enable the terminal to determine, according to the indication information, the second time-frequency resource position of the second resource set or the second resource set group for receiving the downlink data, where the first time-frequency resource position is the same as the second time-frequency resource position.

Or the base station transmits the bitmap indication information, for indicating the resource sets which are not used to transmit the downlink data and the resource sets which are used to transmit the downlink data in the first resource set, to the terminal to enable the terminal to determine, according to the indication information, the second time-frequency resource position of the second resource set for receiving the downlink data, where the second time-frequency resource position includes a time-frequency resource position of a resource set, which are used to transmit the downlink data, in the first resource set.

Or the base station transmits the bitmap indication information, for indicating the resource set subgroups which are not used to transmit the downlink data and the resource set subgroups which are used to transmit the downlink data in the first resource set group, to the terminal to enable the terminal to determine, according to the indication information, the second time-frequency resource position of the second resource set or the second resource set group for receiving the downlink data, where the second time-frequency resource position includes a time-frequency resource position of a resource set subgroup for transmitting the downlink data in the first resource set group.

The technical solutions in the embodiments of the present disclosure at least have the following technical effects or advantages that: by the adoption of the technical solutions in the embodiments of the present disclosure, the utilization rate of the resource for transmitting the downlink data can be increased, and the probability of receiving errors can be reduced, and inconsistency of behaviors of the terminal side and the base station side for transmitting and receiving the data is avoided, thus enhancing the user experience.

Although the embodiments of the present disclosure have been described, those skilled in the art can make other changes and modifications on these embodiments once they acquire the basic creative concept. Therefore, attached claims are intended to be explained to include the embodiments and all the changes and modifications that fall within the scope of the present disclosure.

Obviously, those skilled in the art can make various changes and modifications on the present disclosure without departing from the spirit and scope of the present disclosure. Therefore, if these changes and transformations of the present disclosure fall within the scope of the claims of the present disclosure and equivalent technologies of the present disclosure claims, the present disclosure is intended to include these changes and transformations.

What is claimed is:

1. A method for determining a resource for receiving downlink data, applied to a terminal side, comprising:
   based on received resource configuration information transmitted by a base station, determining a first time-frequency resource position of a first resource set or a first resource set group configured for a terminal by the base station for receiving downlink data; and
   based on received indication information transmitted by the base station for indicating whether all resource sets or each resource set of the first resource set or all resource set subgroups or each resource set subgroup of the first resource set group are/is used to transmit downlink data, determining a second time-frequency resource position of a second resource set or a second resource set group for receiving downlink data, wherein the first resource set group comprises at least one resource set subgroup, and the at least one resource set subgroup comprises at least one resource set.

2. The method according to claim 1, wherein indication information comprises:
   received indication information, transmitted by the base station and carried through a group common physical downlink control channel (PDCCH) or through user equipment (UE) specific downlink control information (DCI) which is used to schedule data, for indicating that all resource sets of the first resource set or all resource set subgroups of the first resource set group are used to transmit downlink data; or,
   received indication information, transmitted by the base station and carried through a group common PDCCH or through UE specific DCI which is used to schedule data, for indicating that all resource sets of the first resource set or all resource set subgroups of the first resource set group are not used to transmit downlink data; or,
   received bitmap indication information, transmitted by the base station and carried through a group common PDCCH, for indicating resource sets which are not used to transmit downlink data and resource sets which are used to transmit downlink data in the first resource set; or,
   received bitmap indication information, transmitted by the base station and carried through a group common PDCCH, for indicating resource set subgroups which are not used to transmit downlink data and resource set subgroups which are used to transmit downlink data in the first resource set group.

3. The method according to claim 1, wherein
   any resource set in the at least one resource set comprises at least one resource block (RB) on a frequency domain and at least one orthogonal frequency division multiplexing (OFDM) symbol on a time domain, or comprises at least one control channel element (CCE), or comprises at least one CCE group, or comprises at least one physical resource block (PRB) group or at least one resource element (RE), or comprises at least one RE group.

4. The method according to claim 1, wherein
   the at least one resource set subgroup is acquired through received grouping information carried in a high-level signaling transmitted by the base station for grouping at least one resource set.

5. The method according to claim 1, wherein resource configuration information comprises:
   received resource configuration information carried in a high-level signaling transmitted by the base station.

6. The method according to claim 1, wherein based on received indication information transmitted by the base station for indicating whether all resource sets or each resource set of the first resource set or all resource set subgroups or each resource set subgroup of the first resource set group are/is used to transmit downlink data, determining the second time-frequency resource position of the second resource set or the second resource set group for receiving downlink data comprises:
   when indication information, transmitted by the base station, for indicating that all resource sets of the first resource set or all resource set subgroups of the first resource set group are used to transmit downlink data, is received, determining the second time-frequency resource position of the second resource set or the second resource set group for receiving downlink data, wherein the first time-frequency resource position is the same as the second time-frequency resource position; or,
   when indication information, transmitted by the base station, for indicating that all resource sets of the first resource set or all resource set subgroups of the first resource set group are not used to transmit downlink data, is received, determining the second time-frequency resource position of the second resource set or the second resource set group for receiving downlink data, wherein the first time-frequency resource position is different from the second time-frequency resource position; or,
   when bitmap indication information, transmitted by the base station, for indicating resource sets which are not used to transmit downlink data and resource sets which are used to transmit downlink data in the first resource set, is received, determining, based on the bitmap indication information, the second time-frequency resource position of the second resource set for receiving downlink data, wherein the second time-frequency resource position comprises a time-frequency resource position of a resource set for transmitting downlink data in the first resource set; or,
   when bitmap indication information, transmitted by the base station, for indicating resource set subgroups which are not used to transmit downlink data and resource set subgroups which are used to transmit downlink data in the first resource set group, is received, determining, based on the bitmap indication information, the second time-frequency resource position of the second resource set group for receiving downlink data, wherein the second time-frequency resource position comprises a time-frequency resource position of a resource set subgroup for transmitting downlink data in the first resource set group.

7. A method for configuring a resource for transmitting downlink data, applied to a base station side, comprising:
   transmitting resource configuration information to a terminal to enable the terminal to acquire a first time-frequency resource position of a first resource set or a first resource set group for receiving downlink data; and transmitting indication information for indicating whether all resource sets or each resource set of the first resource set or all resource set subgroups or each resource set subgroup of the first resource set group are/is used to transmit downlink data to the terminal to enable the terminal to determine, according to indication information, a second time-frequency resource position of a second resource set or a second resource set group for receiving downlink data, wherein the first resource set group comprises at least one resource set subgroup, and any resource set subgroup in the at least one resource set subgroup comprises at least one resource set.

8. The method according to claim 7, wherein the indication information comprises:
indication information, carried through a group common physical downlink control channel (PDCCH) or through user equipment (UE) specific downlink control information (DCI) which is used to schedule data, for indicating that all resource sets of the first resource set or the first resource set group are used to transmit downlink data; or,
indication information, carried through a group common PDCCH or through UE specific DCI which is used to schedule data, for indicating that all resource sets of the first resource set or the first resource set group are not used to transmit downlink data; or,
bitmap indication information, carried through a group common PDCCH, for indicating resource sets which are not used to transmit downlink data and resource sets which are used to transmit downlink data in the first resource set; or,
bitmap indication information, carried through a group common PDCCH, for indicating resource set subgroups which are not used to transmit downlink data and resource set subgroups which are used to transmit downlink data in the first resource set group.

9. The method according to claim 7, wherein
any resource set in the at least one resource set comprises at least one resource block (RB) on a frequency domain and at least one orthogonal frequency division multiplexing (OFDM) symbol on a time domain, or comprises at least one control channel element (CCE), or comprises at least one CCE group, or comprises at least one physical resource block (PRB) group or at least one resource element (RE), or comprises at least one RE group.

10. The method according to claim 7, wherein
the at least one resource set subgroup is acquired through grouping information carried in a high-level signaling transmitted to the terminal for grouping at least one resource set.

11. The method according to claim 7, wherein resource configuration information comprises:
resource configuration information carried in a high-level signaling transmitted to the terminal.

12. The method according to claim 7, wherein the transmitting indication information for indicating whether all resource sets or each resource set of the first resource set or all resource set subgroups or each resource set subgroup of the first resource set group are/is used to transmit downlink data to the terminal to enable the terminal to determine, according to the indication information, the second time-frequency resource position of the second resource set or the second resource set group for receiving downlink data comprises:
transmitting indication information for indicating that all resource sets of the first resource set or the first resource set group are not used to transmit downlink data to the terminal to enable the terminal to determine, according to the indication information, the second time-frequency resource position of the second resource set or the second resource set group for receiving downlink data, wherein the first time-frequency resource position is different from the second time-frequency resource position; or,
transmitting indication information for indicating that all resource sets of the first resource set or the first resource set group are used to transmit downlink data to the terminal to enable the terminal to determine, according to the indication information, the second time-frequency resource position of the second resource set or the second resource set group for receiving downlink data, wherein the first time-frequency resource position is the same as the second time-frequency resource position; or,
transmitting bitmap indication information for indicating resource sets which are not used to transmit downlink data and resource sets which are used to transmit downlink data in the first resource set, to the terminal to enable the terminal to determine, according to bitmap indication information, the second time-frequency resource position of the second resource set for receiving downlink data, wherein the second time-frequency resource position comprises a time-frequency resource position of a resource set for transmitting downlink data in the first resource set; or,
transmitting bitmap indication information for indicating resource set subgroups which are not used to transmit downlink data and resource set subgroups which are used to transmit downlink data in the first resource set group, to the terminal to enable the terminal to determine, according to the bitmap indication information, the second time-frequency resource position of the second resource set group for receiving downlink data, wherein the second time-frequency resource position comprises a time-frequency resource position of a resource set subgroup for transmitting downlink data in the first resource set group.

13. A base station, comprising:
a processor, configured to read programs in a memory and process data according to a requirement of a transceiver; and
the transceiver configured to receive and transmit data under control of the processor and perform the method of claim 7.

14. The base station according to claim 13, wherein indication information comprises:
indication information, carried through a group common physical downlink control channel (PDCCH) or through user equipment (UE) specific downlink control information (DCI) which is used to schedule data, for indicating that all resource sets of the first resource set or the first resource set group are used to transmit downlink data; or,
indication information, carried through a group common PDCCH or through UE specific DCI which is used to schedule data, for indicating that all resource sets of the first resource set or the first resource set group are not used to transmit downlink data; or, bitmap indication information, carried through a group common PDCCH, for indicating resource sets which are not used to transmit downlink data and resource sets which are used to transmit downlink data in the first resource set; or, bitmap indication information, carried through the group common PDCCH, for indicating resource set subgroups which are not used to transmit downlink data and resource set subgroups which are used to transmit downlink data in the first resource set group.

15. The base station according to claim 13, wherein
any resource set in the at least one resource set comprises at least one resource block (RB) on a frequency domain and at least one orthogonal frequency division multiplexing (OFDM) symbol on a time domain, or comprises at least one control channel element (CCE), or comprises at least one CCE group, or comprises at least one physical resource block (PRB) group or at least one resource element (RE), or comprises at least one RE group;
the at least one resource set subgroup is acquired through grouping information carried in a high-level signaling transmitted to the terminal for grouping at least one resource set;
resource configuration information comprises: resource configuration information carried in a high-level signaling transmitted to the terminal.

16. The base station according to claim 13, wherein the transceiver is further configured to:
transmit indication information, for indicating that all resource sets of the first resource set or the first resource set group are not used to transmit downlink data, to the terminal to enable the terminal to determine, according to indication information, the second time-frequency resource position of the second resource set or the second resource set group for receiving downlink data, wherein the first time-frequency resource position is different from the second time-frequency resource position; or,
transmit indication information, for indicating that all resource sets of the first resource set or the first resource set group are used to transmit downlink data, to the terminal to enable the terminal to determine, according to the indication information, the second time-frequency resource position of the second resource set or the second resource set group for receiving downlink data, wherein the first time-frequency resource position is the same as the second time-frequency resource position; or,
transmit bitmap indication information, for indicating resource sets which are not used to transmit downlink data and resource sets which are used to transmit downlink data in the first resource set, to the terminal to enable the terminal to determine, according to the bitmap indication information, the second time-frequency resource position of the second resource set for receiving downlink data, wherein the second time-frequency resource position comprises a time-frequency resource position of a resource set for transmitting downlink data in the first resource set; or,
transmit bitmap indication information for indicating resource set subgroups which are not used to transmit downlink data and resource set subgroups which are used to transmit downlink data in the first resource set group, to the terminal to enable the terminal to determine, according to the bitmap indication information, the second time-frequency resource position of the second resource set group for receiving downlink data, wherein the second time-frequency resource position comprises a time-frequency resource position of a resource et subgroup for transmitting downlink data in the first resource set group.

17. A terminal, comprising:
a processor, configured to read programs in a memory and perform:
based on received resource configuration information transmitted by a base station, determining a first time-frequency resource position of a first resource set or a first resource set group configured for the terminal by the base station for receiving downlink data; and
based on received indication information transmitted by the base station for indicating whether all resource sets or each resource set of the first resource set or all resource set subgroups or each resource set subgroup of the first resource set group are/is used to transmit downlink data, determining a second time-frequency resource position of a second resource set or a second resource set group for receiving downlink data, wherein the first resource set group comprises at least one resource set subgroup, and the at least one resource set subgroup comprises at least one resource set; and
a transceiver, configured to receive and transmit data under control of the processor.

18. The terminal according to claim 17, wherein indication information comprises:
received indication information, transmitted by the base station and carried through a group common physical downlink control channel (PDCCH) or through user equipment (UE) specific downlink control information (DCI) which is used to schedule data, for indicating that all resource sets of the first resource set or all resource set subgroups of the first resource set group are used to transmit downlink data; or,
received indication information, transmitted by the base station and carried through a group common PDCCH or through UE specific DCI which is used to schedule data, for indicating that all resource sets of the first resource set or all resource set subgroups of the first resource set group are not used to transmit downlink data; or,
received bitmap indication information, transmitted by the base station and carried through a group common PDCCH, for indicating resource sets which are not used to transmit downlink data and resource sets which are used to transmit downlink data in the first resource set; or,
received bitmap indication information, transmitted by the base station and carried through a group common PDCCH, for indicating resource set subgroups which are not used to transmit downlink data and resource set subgroups which are used to transmit downlink data in the first resource set group.

19. The terminal according to claim 17, wherein
any resource set in the at least one resource set comprises at least one resource block (RB) on a frequency domain and at least one orthogonal frequency division multiplexing (OFDM) symbol on a time domain, or comprises at least one control channel element (CCE), or comprises at least one CCE group, or comprises at least one physical resource block (PRB) group or at least one resource element (RE), or comprises at least one RE group;

the at least one resource set subgroup is acquired through received grouping information carried in a high-level signaling transmitted by the base station for grouping at least one resource set;
resource configuration information comprises: received resource configuration information carried in a high-level signaling transmitted by the base station.

20. The terminal according to claim 17, wherein the processor is further configured to read the programs in the memory to:
determine the second time-frequency resource position of the second resource set or the second resource set group for receiving downlink data when indication information, transmitted by the base station, for indicating that all resource sets of the first resource set or all resource set subgroups of the first resource set group are used to transmit downlink data, is received, wherein the first time-frequency resource position is the same as the second time-frequency resource position; or,
determine the second time-frequency resource position of the second resource set or the second resource set group for receiving downlink data when indication information, transmitted by the base station, for indicating that all resource sets of the first resource set or all resource set subgroups of the first resource set group are not used to transmit downlink data, is received, wherein the first time-frequency resource position is different from the second time-frequency resource position; or,
determine, based on bitmap indication information, a second time-frequency resource position of a second resource set for receiving downlink data when bitmap indication information, transmitted by the base station, for indicating resource sets which are not used to transmit downlink data and resource sets which are used to transmit downlink data in the first resource set, is received, wherein the second time-frequency resource position comprises a time-frequency resource position of a resource set for transmitting downlink data in the first resource set; or,
determine, based on bitmap indication information, the second time-frequency resource position of the second resource set group for receiving downlink data when the bitmap indication information, transmitted by the base station, for indicating resource set subgroups which are not used to transmit downlink data and resource set subgroups which are used to transmit downlink data in the first resource set group, is received, wherein the second time-frequency resource position comprises a time-frequency resource position of a resource set subgroup for transmitting downlink data in the first resource set group.

* * * * *